(12) United States Patent
Brockhurst

(10) Patent No.: US 12,032,350 B2
(45) Date of Patent: Jul. 9, 2024

(54) MULTI-PHASE MATERIAL BLEND MONITORING AND CONTROL

(71) Applicant: Caterpillar Global Mining LLC, Tucson, AZ (US)

(72) Inventor: Russell A. Brockhurst, Brisbane (AU)

(73) Assignee: Caterpillar Global Mining LLC, Tucson, AZ (US)

( * ) Notice: Subject to any disclaimer, the term of this patent is extended or adjusted under 35 U.S.C. 154(b) by 523 days.

(21) Appl. No.: 16/847,465

(22) Filed: Apr. 13, 2020

(65) Prior Publication Data
US 2021/0318666 A1 Oct. 14, 2021

(51) Int. Cl.
| | |
|---|---|
| *G05B 19/19* | (2006.01) |
| *E02F 9/20* | (2006.01) |
| *E02F 9/26* | (2006.01) |
| *G06N 5/025* | (2023.01) |

(52) U.S. Cl.
CPC ............ *G05B 19/19* (2013.01); *E02F 9/2054* (2013.01); *E02F 9/262* (2013.01); *G06N 5/025* (2013.01); *G05B 2219/31266* (2013.01)

(58) Field of Classification Search
CPC .......... E02F 1/00–9/2891; G05B 19/19; G05B 2219/31266; G05B 13/0265; G06N 5/025; G06N 20/00; Y02P 80/40; B28C 7/00; B28C 7/04; B01F 35/80; B01F 35/81; B01F 35/82; B01F 35/831; G05D 1/10011; G05D 1/021; G05D 1/0212; G05D 1/0219; G05D 1/0221; G05D 11/00–11/16; G05D 27/00–27/02; G05D 29/00; G05D 2201/0201; G05D 2201/0202; G05D 2201/021; G05D 1/00–1/12
USPC .......................................................... 701/59
See application file for complete search history.

(56) References Cited

U.S. PATENT DOCUMENTS

| | | | |
|---|---|---|---|
| 7,489,993 | B2 | 2/2009 | Coffee et al. |
| 8,903,612 | B2 | 12/2014 | Tejeda et al. |
| 9,140,567 | B2 | 9/2015 | Fryer et al. |
| 9,632,506 | B2 | 4/2017 | Wellman et al. |
| 9,685,009 | B2* | 6/2017 | Sprock ................... G07C 5/008 |
| 9,695,571 | B1 | 7/2017 | Ge et al. |
| 9,792,739 | B2* | 10/2017 | Thomsen ................ G01P 15/02 |
| 9,818,302 | B2 | 11/2017 | McCormick et al. |
| 9,989,511 | B2* | 6/2018 | Talmaki .................... G01S 5/02 |
| 10,192,370 | B2 | 1/2019 | Davidson et al. |
| 10,467,558 | B2 | 11/2019 | Mason et al. |

(Continued)

*Primary Examiner* — Mohamed Abdo Algehaim

(57) ABSTRACT

Industrial machines at a mine site or other worksite are monitored and controlled using a multi-phase implementation, based on data received from multiple data sources at different times. Machine telemetry data or other sensor data received from a first machine, in combination with additional sensor data from other machines at the site, detailed material attribute data received from external data sources, and/or outputs from trained machine-learned models, are used to determine characteristics of a material load and/or material blend, and to control machines at the mine site. A control system performs a multi-phase implementation for monitoring machines and/or load data in response to data received at different times, updating the material load and blend characteristics, and controlling machines at the site based on the characteristics of the material load or material blend.

20 Claims, 9 Drawing Sheets

(56) References Cited

U.S. PATENT DOCUMENTS

| | | | |
|---|---|---|---|
| 2006/0244587 A1 | 11/2006 | Humphries et al. | |
| 2007/0135985 A1* | 6/2007 | Berry | E02F 9/2029 701/50 |
| 2009/0076674 A1* | 3/2009 | Kiegerl | E02F 9/264 701/2 |
| 2010/0082157 A1* | 4/2010 | McGarel | G05D 11/132 700/265 |
| 2012/0287745 A1* | 11/2012 | Ghiraldi | A01K 5/0275 366/152.1 |
| 2014/0180547 A1* | 6/2014 | Edara | G05D 1/0278 701/50 |
| 2014/0373755 A1* | 12/2014 | Forgeron | B28C 5/4203 106/638 |
| 2015/0134184 A1* | 5/2015 | Takeda | G06Q 50/02 701/517 |
| 2015/0178859 A1* | 6/2015 | Takeda | G06Q 10/08 705/7.24 |
| 2015/0269685 A1* | 9/2015 | Takeda | E02F 9/2054 705/7.22 |
| 2015/0376868 A1* | 12/2015 | Jackson | E02F 3/43 701/50 |
| 2016/0040396 A1* | 2/2016 | Klungseth | E02F 9/2054 701/50 |
| 2016/0292933 A1* | 10/2016 | Sprock | G06Q 50/08 |
| 2016/0299116 A1* | 10/2016 | Talmaki | G01S 5/02 |
| 2016/0300175 A1* | 10/2016 | Talmaki | G06Q 10/06315 |
| 2017/0016874 A1* | 1/2017 | Radjy | B28C 7/024 |
| 2017/0169626 A1* | 6/2017 | Thomsen | G06Q 50/02 |
| 2017/0344011 A1* | 11/2017 | Stratton | G05D 1/0276 |
| 2018/0071949 A1* | 3/2018 | Giles | E04G 21/0463 |
| 2018/0137446 A1* | 5/2018 | Shike | E02F 9/2054 |
| 2018/0174377 A1* | 6/2018 | Collins | E02F 9/261 |
| 2019/0033808 A1* | 1/2019 | Mountford | G05B 19/042 |
| 2019/0080525 A1* | 3/2019 | Sherlock | E02F 5/02 |
| 2019/0318551 A1* | 10/2019 | Sherlock | E02F 5/02 |
| 2019/0325669 A1* | 10/2019 | Flood | G07C 5/02 |
| 2020/0190775 A1* | 6/2020 | Selvaraj | E02F 9/261 |
| 2020/0223097 A1* | 7/2020 | Koppelaar | B28C 7/02 |
| 2021/0063336 A1* | 3/2021 | Ghods | G01N 29/07 |
| 2021/0097462 A1* | 4/2021 | Brickner | E02F 9/2054 |
| 2021/0237311 A1* | 8/2021 | Datema | B28C 5/4234 |
| 2021/0304114 A1* | 9/2021 | Sarkaria | G06Q 10/0631 |
| 2022/0364331 A1* | 11/2022 | Ouellette | B60K 35/00 |

\* cited by examiner

HISTORICAL / PREDICTED MATERIAL TRACKING EVENTS

| ID | Event Class | Start Time | End Time | Material Grades | Material ID | Material Modifiers | Mass | Machine ID | Machine Category | Source Block ID | Source Block Location |
|---|---|---|---|---|---|---|---|---|---|---|---|
| 124 | ev4 | 14:31:22 | 14:31:57 | Cu-54.8 | Cu, Ni | ab_2 | 1391.7 | tr_11 | 4 | a78 | 17 |
| 125 | ev2 | 14:33:47 | 14:33:58 | Au-35.9 | Ag, Au | af_6 | 225.4 | ex_6 | 8 | a79 | 13 |
| 126 | ev4 | 14:33:51 | 14:34:32 | Ag-64.1 | Ag, Pb | ah_1 | 1514.3 | tr_18 | 4 | a91 | 8 |
| ... | ... | ... | ... | ... | ... | ... | ... | ... | ... | ... | ... |

MATERIAL TRACKING EVENT MODIFICATIONS

| Machine ID | Source Block ID | Material Attributes | Source of Modification | Override? |
|---|---|---|---|---|
| tr_14 | a37 | tr_15 | ml_sys_3 | Y |
| ex_8 | a76 | a83 | tr_12 | N |
| wl_3 | a112 | Au-41.2 | ext_sys_14 | N |
| ... | ... | ... | ... | ... |

MULTI-PHASE MATERIAL BLEND MONITORING AND CONTROL

TECHNICAL FIELD

This disclosure relates generally to controlling machines at worksites such as construction, industrial, and/or mining sites, and, more specifically, to systems configured to monitor and control machines, during a multi-phase process, in order to achieve a target blend of material.

BACKGROUND

Industrial worksites such as construction areas, mine sites, paving sites, and the like include machines, equipment, and/or personnel to perform various functions. For example, a mining site includes excavators, haul trucks, crushers, sensors, and operators to mine and transport material resources. The coordinated operation of such machines is useful in maintaining efficiency at the site. In some instances, worksite tasks are assigned remotely via a control system using wireless network technologies. Additionally, machines at a worksite can be autonomous or semi-autonomous. Assigning tasks remotely using autonomous systems increases efficiency and improves safety outcomes at the worksite.

Transport and management of materials at mine sites, using the example machines described herein, makes up a significant amount of the overall costs of the mining operations. At a mine site, machines are assigned to transport materials from sources such as mining blocks or stockpiles, to one or more processing locations, such as hauler beds or crushers. Mining operations often require a material to be mixed prior to leaving the mine site, in accordance with an optimal material blend and/or target blend range. However, the attributes and quality of the mined source materials differ at various locations across the mine site, and achieving a target blend typically requires combining materials from various locations around the mine site.

An example site management system for tracking material movement at a mine site is described in U.S. Patent Application Publication No. 2019/0033808A1 (hereinafter referred to as "the '808 reference"). In particular, the '808 reference describes a system in which the movements of machines at a mining site are monitored to determining and track a material blend (or blend of material) at each processor. The '808 reference also describes modifying the operating instructions of the machines at the site to maintain the blend of material within a target blend range. However, the '808 reference relies on near-real time machine telemetry data to dispatch machines and manage materials blends. When the machine telemetry data is incomplete or erroneous, for example, based on faulty sensors, network failures, or ambiguous telemetry data, systems like that in '808 reference generate sub-optimal blend control determinations and machine assignments.

Example embodiments of the present disclosure are directed toward overcoming the deficiencies described above.

SUMMARY

In an example of the present disclosure, a system includes a first machine operable to transport materials from one or more material sources to one or more material processors associated with an environment, and a control system having one or more central processing units (CPUs), and memory storing executable instructions that, when executed by the one or more CPUs, cause the control system to perform operations comprising receiving first data from the first machine, the first data associated with a first material load transported by the first machine, receiving second data from a second data source separate from the first machine, wherein the second data is associated with at least one of the first machine or the first material load, determining one or more characteristics of the first material load, based at least in part on the first data and the second data, determining one or more operating instructions for a second machine, separate from first machine, based at least in part on the characteristics of the first material load, and providing the operating instructions to the second machine.

In another example of the present disclosure, a method includes receiving first data from a first machine operating in an environment, the first data associated with a first material load transported by the first machine, receiving second data from a second data source separate from the first machine, wherein the second data is associated with at least one of the first machine or the first material load, determining one or more characteristics of the first material load, based at least in part on the first data and the second data, determining one or more operating instructions for a second machine, separate from first machine, based at least in part on the characteristics of the first material load, and providing the operating instructions to the second machine.

In yet another example of the present disclosure, a system includes a first hauling machine operable to transport materials from one or more material sources to one or more material processors within an environment, the first hauling machine comprising one or more sensors configured to detect at least one of machine state data or environmental data at the first hauling machine, and a first wireless communication system, a second hauling machine operable to transport materials from the one or more material sources to the one or more material processors within the environment, the second hauling machine comprising, one or more sensors configured to detect at least one of machine state data or environmental data at the second hauling machine; and a second wireless communication system, and a remote processing system having one or more central processing units (CPUs), and memory storing executable instructions that, when executed by the one or more CPUs, cause the remote processing system to perform operations comprising receiving first sensor data from the first hauling machine via the first wireless communication system, the first sensor data associated with a first material load transported by the first hauling machine, receiving second data from a second data source separate from the first hauling machine, wherein the second data is associated with at least one of the first hauling machine or the first material load, determining one or more characteristics of the first material load, based at least in part on the first sensor data and the second data, determining one or more operating instructions for the second hauling machine, based at least in part on the characteristics of the first material load, transmitting the operating instructions to the second hauling machine.

BRIEF DESCRIPTION OF DRAWINGS

FIG. 6 is an example table illustrating a set of material tracking events, in accordance with one or more examples of the present disclosure.

DETAILED DESCRIPTION

Figure 1:
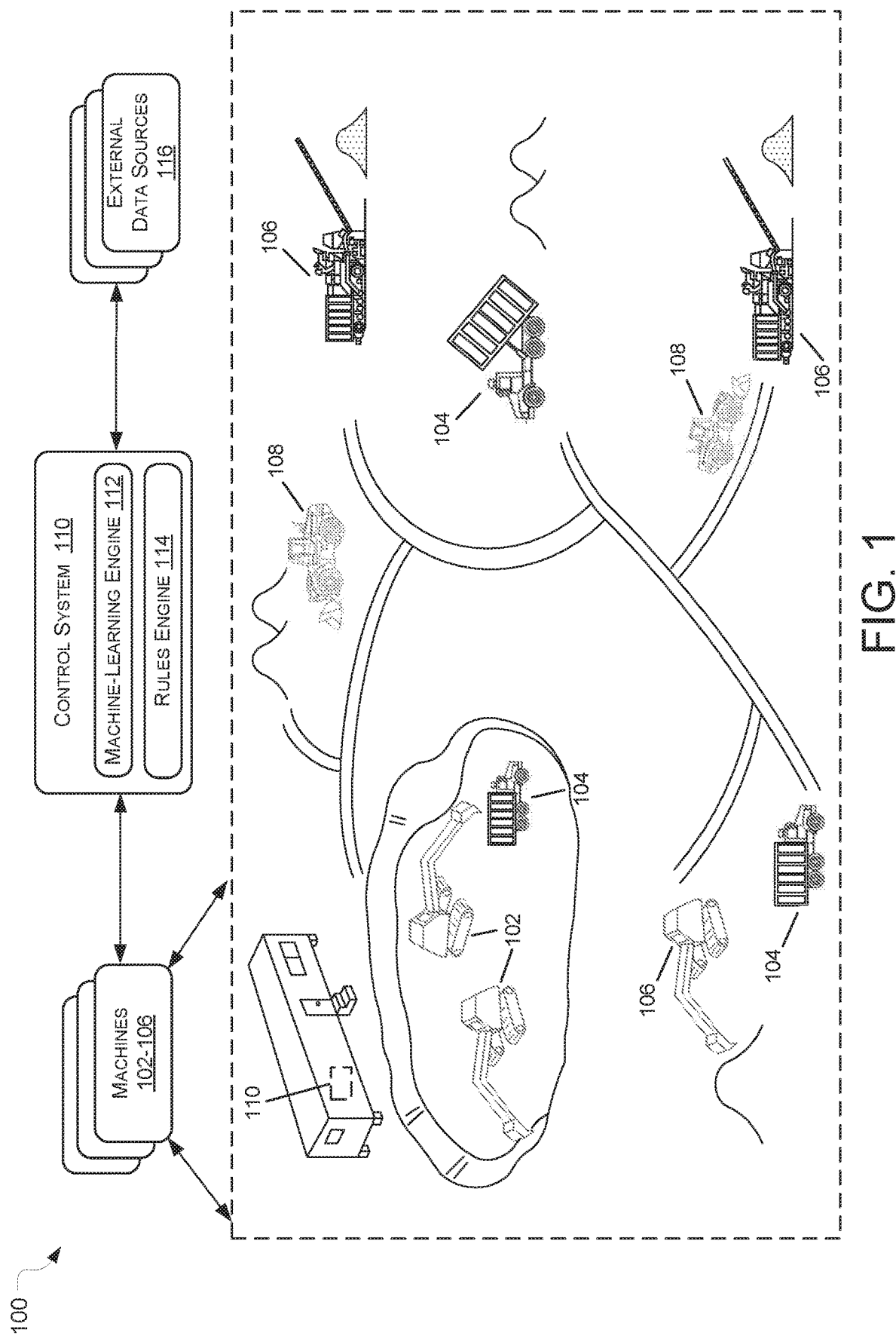
FIG. 1 is an example diagram of a physical environment including materials and machines, and a related computing environment for monitoring and controlling the machines, in accordance with one or more examples of the present disclosure.

Wherever possible, the same reference numbers will be used throughout the drawings to refer to the same or like parts. Referring to FIG. 1, an example environment 100 is shown as a mining location at which a number of machines 102-108 are used to dig, transport, and process source materials, and a control system 110 monitors and controls the operations of machines 102-108 to manage the characteristics of a material blend. The control system 110 receives and analyzes data from machines 102-108, such as telemetry data and other sensor data, as well as data from additional data sources. For instance, in addition to sensor data from a particular machine 102-108, the control system 110 may receive additional site-wide sensor data from other machines 102-108 in the environment, output from a machine-learning engine 112 or a rules engine 114, and/or detailed material attribute data from external data sources 116. Additionally, the control system 110 determines characteristics for an individual material load and/or a material blend based on data from the combination of data sources. In various examples, the control system 110 receives data relating to a single machine or single material load, from different machines/data sources at different times. In such cases, the control system 110 performs a multi-phase analysis, including determining material load characteristics, blend characteristics, and machine operating instructions in response to receiving first data (e.g., machine sensor data). The control system 110 also updates the characteristics and machine operating instructions one or more times in response to receiving additional data (e.g., additional machine sensor data, machine-learning model outputs, and/or external material attribute data, etc.).

The example environment 100 depicted in FIG. 1 schematically illustrates various operational mining scenarios for extracting materials from material sources (e.g., mining blocks, stockpiles, intermediate stockpiles) using excavators 102, and transporting the materials, using trucks 104, to destinations such as crushers 106, dumps, or other material destination. FIG. 1 illustrates additional mining scenarios which wheel loaders 108 load material from a stockpile and dump the material directly into a crusher 106. In some examples, a material destination (e.g., a stockpile) can act as an intermediate material source before the material is transported to a final destination (e.g., a crusher 106 or dump) at the mine site. Various operational scenarios are implemented within the environment 100, including different source cardinalities, source types, loader types, haulage types, and processor types, and different blends at different processors, etc.

Additional or alternative operations performed at the site include, for instance, tunnel mining, blasting, and/or other mining or landscaping operations. Although the environment 100 is illustrated as a mining location in this example, the techniques described herein apply to other environments and geographic areas, such as paving sites, industrial sites, factory floors, building construction sites, road construction sites, quarries, or the like. Moreover, features of the environment 100 change over time, e.g., as the environment 100 develops from mining, digging, grading, and/or other machine-based actions and/or because of erosion or other natural changes.

As noted above, FIG. 1 illustrates a variety of machines performing mining tasks, including excavators 102 digging materials at material source locations, trucks 104 and wheel loaders 108 performing hauling and dumping operations throughout the environment 100, and crushers 106 receiving and processing materials. The machines shown in FIG. 1 are illustrative, and other machines such as earth-moving machines (e.g., wheel loaders, dump trucks, backhoes, bulldozers, or material handlers), tankers for carrying water or fuel, over-the-road vehicles, work machines pavers or compactors), or the like are present in the environment 100 as well. Moreover, other locations or types of environments include different machines, and the techniques described herein apply similarly to these different locations/environments. As used herein, the term "machine" refers to any type of machine that performs relevant operation associated with a given industry such as mining, construction, farming, transportation, oil and gas, manufacturing, or any other industry. Additionally, throughout this disclosure, for simplicity, machines including the excavators 102, trucks 104, crushers 106, and wheel loaders 108, and other machines are referred to as "machine(s) 102."

In some examples, the tasks, jobs, or operations performed in the environment 100 are partially or completely autonomous. For instance, certain machines 102-108 include automated components, internal rules engines and/or machine-learning components to autonomously perform operations in response to conditions detected by the machines. However, machine operators or other personnel are also present to control the machine operations in some examples. For instance, operators within machines 102-108 directly control the machines using on-board controls, and/or remote operators at separate locations (e.g., workstations) remotely control machines 102-108 via wireless communication systems. Although several examples of operations, tasks, or jobs performed by machines 102-108 and/or personnel are described herein, these examples are illustrative and non-limiting, and the techniques described herein are used to perform any machine operation. In some instances, machines 102-108 are controlled based on data from various data sources to perform operations activating any of the controls of the machines 102-108, and/or operations monitoring or overseeing the machines 102-108 or the environment 100 (e.g., to identify obstacles or machine malfunctions). For example, machines 102-108 receive operating instructions from the control system 110, to extract, haul, and/or process materials, in order to manage the characteristics of a material blend.

Certain machines 102-108 are configured with or otherwise have access to sensing components and wireless communication systems, which are described in more detail below. In some cases, accompanying sensing components and communication systems are used by in-person and/or remote operators to control the machines 102-108. For example, machines 102-108 include transceiver systems including antennas or other network components to facilitate wireless communication (e.g., via radio frequency (RF) signals, via a wireless network, such as a local area network (LAN) or a wide-area network (WAN)), or any other communication protocols. Machines 102-108 may be configured to communicate with a central hub, such as control system 110, where the central hub is configured to receive communications from machines 102-108 and transmit or re-route communications to other machines or other external systems. In some examples, machines 102-108 transmit individual communications to the central hub in real-time or near real-time. In other examples, the machines 102-108 record and store a group of multiple communications, and then transmit the group of communications to the central hub in a batch. In such examples, the batching and periodic transmission of communications from machines 102-108 causes the control system 110 to receive data at different times and/or in different phases. Additionally or alternatively, machines 102-108 may include communication systems configured to communicate directly with other machines (e.g., via a distributed network). Hybrid networks and/or different communication networks and protocols are alternatively used, and this disclosure is not dependent upon a single arrangement, technology or protocol. In some examples, machines 102-108 also include mobile phones, tablet devices, radios, headsets, and/or other associated electronic devices configured to enable communication between the machines 102-108 and remote systems or devices, or operators/personnel or person at a remote location.

As noted above, the environment 100 includes a control system 110 having hardware and software-based components for monitoring, controlling, and communicating with various machines 102-108 in the environment 100. The control system 110 includes one or more servers, processors, and memory communicatively coupled with the processors. In the illustrated example, the memory of the control system 110 stores software-based components to perform various processes and techniques described herein of the control system 110, including the machine-learning engine 112 and rules engine 114. In some examples, the machine-learning engine 112 executes trained machine-learned models based on the data received from machines 102-108, and the rules engine weights and/or prioritizes data based on the different sources of data (e.g., machines 102-108, machine-learning engine 112, external data sources 116, and/or operator inputs). The control system 110 in this example is implemented within an on-site workstation, such as office, building, vehicle, or the like, where one or more of remote operators are situated. For example, the workstation contains one or more offices in which a supervisor, a foreman, and/or different personnel are stationed. In some implementations, the workstation acts as a hub, for example, including the control system 110 and serving as a location at which the various machines 102-108 are controlled. In this example, the control system 110 is configured to implement some or all of the processes and techniques described herein. However, although FIG. 1 illustrates the control system 110 as associated with the workstation, the workstation and/or control system 110 are located off-site or in a different location in various examples. For instance, some or all of the components of control system 110 may be integrated into a single machine 102-108, or distributed across multiple machines 102-108 in the environment 100. In other cases, the control system 110 is implemented as a remote computing system, cloud-based computing system, or other computing systems configured to communicate with machines 102-108 via one or more networks.

In some examples, the control system 110 monitors and tracks the extraction, movement, and processing of materials, performed by the various machines 102-108 within the environment. For instance, the monitoring and analysis of machine sensor data, and data from additional sources, allow the control system 110 to track the attributes of the incoming material that is transmitted to a crusher 106, wherein the blend of material, or blend of material, is an aggregate of incoming material from multiple loads. In some cases, a target material blend is described using a collection of constraints (e.g. minimum and maximum thresholds defining a target range) for the material attributes such as material grades, material modifiers, source blocks, locked destinations, mass, etc. Blends are maintained over time-based and/or mass-based blend windows. In some examples, the control system 110 calculates blends across N-hour time windows or N-material ton windows. The control system 110 calculates the current state of the blend over the cumulative material tipped into a processor (e.g., crusher 106) over the defined blend window, which includes both material that was tipped into the processor and material that is predicted to be tipped into the processor. As described in the examples herein, the control system 110 monitors movement of the machines 102-108 (e.g., based on location sensor data received from machines 102-108, or other monitoring sensors/cameras in the environment 100), tracks a material blend at a crusher 106, and determines (or modifies) operating instructions for the machines 102-108 to maintain the material blend within a target blend range.

In more detail, FIG. 1 schematically illustrates that the control system 110 receives data from the machines 102-108 within the environment 100 and/or external data source(s) 116. The control system 110 also includes a machine-learning engine 112 and/or a rules engine 114 to analyze the data and determine machine control operations. In this example, the machine-learning engine 112 and/or a rules engine 114 are included within the control system 110; however, in other examples one or both of the machine-learning engine 112 or the rules engine 114 are implemented on remote computing systems which are accessible to the control system via computer network(s).

In some examples, the control system 110 receives first data from a machine 102-108 in the environment 100. The machine 102-108 can be any machine described herein operable within the environment 100, and the data may include any type of data collected or captured by the machine. For instance, data received by the control system 110 can include machine telemetry data associated with any of the controls or internal systems of the machine. Telemetry data for a machine include data indicative of (or representing) any operations performed by the machine controls. For instance, for a digging machine such as an excavator 102, the telemetry data includes data describing any movements of excavator 102 (e.g., forward and backward movement, rotational movements, etc.), and the movement and actions of digging arm (e.g., extending, contracting, scooping, performing "a dipper" action to empty its bucket, etc.), and the like. For a truck 104 or other hauling machine, the telemetry data includes data describing the locations and/or movements of truck 104 (e.g., forward and reverse driving, driving speeds and directions, etc.), and the movements and actions of the dump body (e.g., extending pistons to tip the dump body, contracting the pistons to return the dump body to a flat position, opening or closing an automated tailgate, etc.), and the like. For a crusher 106, the telemetry data includes data describing the activation and deactivation of the crusher (e.g., time, duration, etc.). These examples of machines and associated telemetry data are illustrative, and the telemetry data received by the control system 110 may include any operational data, status data, or environmental data from the machines 102-108.

The control system 110 also receives other types of sensor data from machines 102-108 in various examples. For instance, some of the machines from 102-108 include weight sensors and/or pressure sensors to determine a weight of a current load of material carried by the machine at any time. These machines 102-108 provide the weight sensor data and associated time data to the control system 110. Additionally, machines 102-108 include different combinations of additional sensors, such as operational sensors (e.g., engine speed sensors, engine temperature sensors, oil temperature sensors, oil pressure sensors, hydraulic fluid pressure, fuel level sensors, etc.), locational sensors (such as inertial sensors, cameras, microphones, object detection sensors, and environment sensors, etc.) and the like. The control system 110 use data from these various sensors to determine information about the state, usage, and surrounding environment of the machines 102-108.

In some examples, the control system 110 uses the data received from one or more machines to determine characteristics of a material load associated with those machines. For instance, for an excavator 102 used to collect material at a mine site and load (e.g., dump) the collected material into the bed of a truck 104, the control system 110 may use the location of excavator 102 associated with various machine telemetry (e.g., location at each of the dippers performed, timing of dippers, etc.) to identify which loading tools (e.g., excavators 102) loaded a truck 104, and determine how much material was moved from the excavator(s) 102 to the truck 104. In other examples, the control system 110 uses the locations of the truck 104 and various associated telemetry data (e.g., weight sensors, dump body movements, dumping events) at different times to determine where the truck 104 received a load of material and where the truck 104 deposited the load of material. By analyzing the combined data from multiple machines 102-108, along with material attribute data for different locations (e.g., mining blocks) in the environment, the control system 110 determines material characteristics for a load of material carried by a truck 104. Likewise, the control system 110 determines material characteristics for a material blend at a processor (e.g., crusher 106, dump, stockpile, etc.) that includes multiple loads from different trucks and/or at different times. For instance, control system 110 may use material attribute such as amounts of various materials present, material grades, material modifiers, impurities, etc., for a particular mining block, along with data indicating how many dippers were extracted from that mining block by loading tools, and which loading tool(s) were used to load a truck 104, to determine the material attribute data for the load or blend.

As this example illustrates, the control system 110 may determine characteristics of material loads and/or blends based on data received from one or more machines 102-108, without requiring any additional data. However, in other examples, the control system 110 receives and analyzes data from multiple different data sources to determine additional and/or updated characteristics for a load or blend. For instance, in the example shown in FIG. 1, the control system 110 receives data from multiple machines 102-108, correlates the data received from different machines 102-108, and analyzes the data to determine the characteristics of loads of materials and blends. The control system 110 also receive additional data from external data sources 116, such as more detailed and accurate material attribute data. Additionally, the control system 110 uses the machine-learning engine 112 and/or the rules engine 114, based on any combination of the data received at the control system 110, to perform further analyses and generated updated material load and blend data. These examples of receiving and using data from additional data sources to determine material load and blend characteristics, and control machines 102-108 accordingly, are described below. Further, in some examples, control system 110 receives data from different data sources at different times and uses a multi-phase approach to initially determine and then updated material load/blend characteristics, and instructions for controlling machines 102-108.

In some examples, the control system 110 receives data from a first machine 102-108 relating to a particular material load. The first machine 102-108 is, for instance, a machine that extracted, transported, or processed the material load, and the telemetry and/or sensor data corresponds to those extraction, transportation, or processing activities performed by the first machine. After receiving the sensor data and/or telemetry data from the first machine 102-108, the control system 110 receives associated sensor and/or telemetry data from other machines 102-108 in the environment 100. In some instances, the control system 110 receives a set of site-wide sensor/telemetry data from the other machines 102-108 in the environment. The control system 110 correlates the data received from the first machine with data from other machines 102-108 and analyzes the correlated data together to make determinations about the material load that was extracted/transported/processed by the first machine. For example, the control system 110 performs time-based correlations between the positions of loading tools (e.g., excavators 102, wheel loaders 108, etc.) in the environment 100, and the positions of trucks 104 at loading times, to determine which loading tools loaded material into each truck 104.

In an example, an excavator 102 records and transmits to the control system 110 the number of "dippers" (e.g., bucket emptying operations) the excavator 102 performs while it is filling a truck 104. In scenarios where the control system 110 receives sensor data from a single machine (e.g., the excavator 102), the control system 110 might determine that each dipper from the excavator 102 was performed to empty bucket of material into the truck 104. However, in scenarios where the control system 110 receives and correlates sensor data from multiple machines (e.g., the excavator 102 and the truck 104), the control system 110 may correlate the sensor data based on times and/or locations to determine that the machines were collaborating, or otherwise were operating at the same proximate location at the same proximate time. For instance, the control system 110 receives and correlates sensor data and/or telemetry data, by time and locational coordinates, for a group of machines working at certain geographical area during a specific time period.

The control system 110 also analyzes combinations of sensor data to make determinations about the material load extracted/transported/processed by the machines. For instance, the control system 110 correlates the sensor data received from an excavator 102 (e.g., times and locations of dippers), with the sensor data received from a truck 104 (e.g., times and locations associated with changes to the weight sensor data for the dump body, etc.). As an example, the control system 110 receives telemetry data from an excavator 102 indicative of a number of dippers in which the excavator 102 emptied its bucket. The telemetry data includes, for each dipper performed by the excavator 102, a location (e.g., GPS coordinates) and a timestamp. In some cases, additional telemetry data is included for the dippers, such as the movement or orientation of the excavator 102 at the time of the dipper, and/or other environmental conditions at the time of the dipper.

In this example, the control system 110 receives telemetry data from a truck 104 operating at the same proximate location as the excavator 102 and at the same proximate time. The telemetry data received from the truck 104 includes, for instance, the location (e.g., UPS coordinates) for the truck 104 at different times, position data (e.g., vehicle orientation, inclination of the dump body) at different times, and/or movement data and driving activities for the truck 104 (e.g., speed, acceleration, trajectory, gear, etc.) at different times. Additional telemetry data received from the truck 104 includes data from weight sensors and/or pressure sensors associated with the dump body (and/or specific locations within the dump body) at different times.

In this example, the control system 110 performs correlations of the sensor data and/or telemetry data received from the excavator 102 and the truck 104, and determines which dippers from excavator 102 where emptied into the truck 104 and which dippers were not emptied into the truck 104. For instance, for a first dipper recorded by the excavator 102, the control system 110 compares the location of the excavator 102 at the time of the dipper, with the location of the truck 104 at the same time. If the location of the excavator 102 and truck 104 are the same or similar (e.g., within a distance threshold), the control system 110 determines that the dipper was dropped from the bucket of the excavator 102 into the dump body of the truck 104. Additionally, in some examples, the control system 110 analyzes weight/pressure sensor data for the dump body of the truck 104 at times before, during, and after the dipper was performed. If, at a same proximate time the dipper was performed by the excavator 102, the weight in the dump body of the truck 104 increases by greater than a threshold amount, the control system 110 determines that the dipper included a material load that was dumped into the dump body of the truck 104, and also determines the size (e.g., weight or mass) of the material load. In examples when the excavator 102 includes weight/pressure sensors in the bucket, the control system 110 uses the corresponding data from these sensors as a second data source to determine or confirm the size (e.g., weight or mass) of a dipper.

As another example, for a second dipper recorded by the excavator 102, the control system 110 compares the location of the excavator 102 at the time of the second dipper, with the location of the truck 104 at the time of the second dipper. If the location of the excavator 102 and truck 104 are not the same or similar (e.g., meeting or exceeding a distance threshold), the control system 110 determines that the dipper was not dropped from the bucket of the excavator 102 into the dump body of the truck 104. Additionally, even if the locations of the excavator 102 and truck 104 are the same at the time of the dipper, the control system 110 further analyzes the weight/pressure sensor data associated with the bucket of the excavator 102, and/or the dump body of the truck 104, at times before, during, and after the dipper was performed. If the weight of material held by the bucket of the excavator 102 does not decrease at the proximate time the dipper was performed, and/or if the weight of material in the dump body of the truck 104 does not increase at the proximate time the dipper was performed (e.g., by more than a threshold amount), the control system 110 determines that the dipper did not include a material load and/or that the material load was not dumped into the truck 104. Instead, in this example the control system 110 determines that the excavator 102 performed the second dipper for another purpose (e.g., bucket clearing, dumps with empty buckets, site cleaning, moving miscellaneous materials, etc.).

In some examples, the control system 110 determines and uses the location of a specific portion of the excavator 102, such as the arm or bucket of the excavator 102, instead of or in addition to the location of the excavator 102 as a whole (e.g., the excavator body). In some implementations, different portions of the excavator 102 include different locational sensors. Additionally or alternatively, the control system 110 calculates the location of a portion of the excavator 102 (e.g., the arm or bucket) based on the location of the excavator 102, the size dimensions of the excavator 102, and the orientation and/or position of the excavator 102 at the time of the measurement.

In another example, the control system 110 uses time and location data to correlate the location of the excavator 102 with two (or more) different trucks during the same time period. Based on the sensor data received from the trucks 104, the control system 110 determines the number of dippers that were emptied into each truck 104 by the excavator 102. Similarly, the control system 110 uses time and location data to correlate the location of two (or more) excavators 102 with a single truck during the same time period. Based on the sensor data received from the excavators 102 and the truck 104, the control system 110 determines the number of dippers that were emptied into each truck 104 by each excavator 102.

Figure 2:
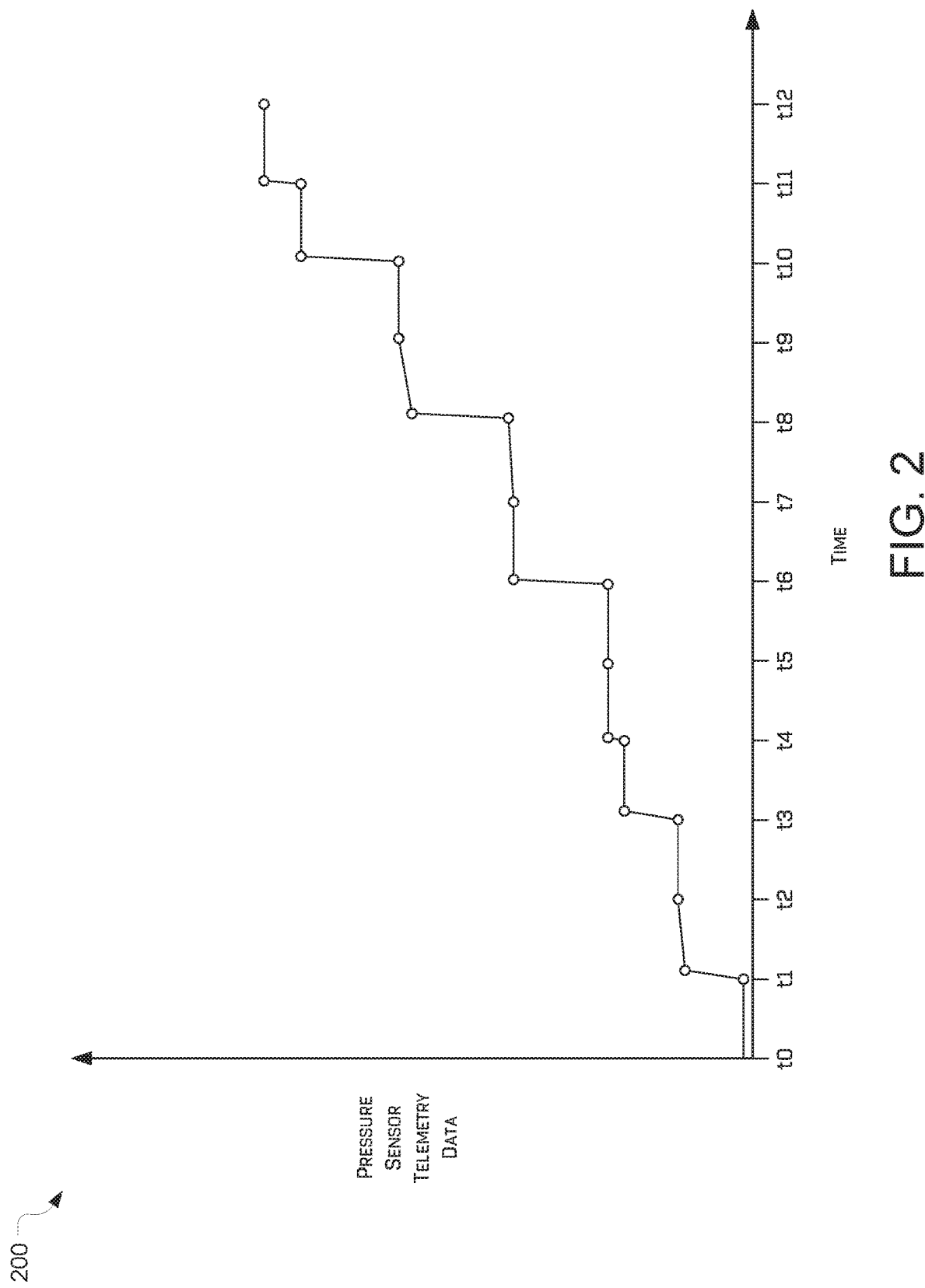
FIG. 2 is an example chart showing illustrative pressure sensor telemetry data from a machine, in accordance with one or more examples of the present disclosure.

For example, referring briefly to FIG. 2, a chart 200 is shown including illustrative telemetry data from a dump body weight sensor of a truck 104. In this example, the weight of a material load within the dump body of the truck 104 is captured over the time period from t0 to t12. The control system 110 correlates the weight data from the truck 104 with the timing of dippers from one or more excavators 102, to determine which dippers dropped material into the truck 104 and which did not. For instance, if a first excavator 102a performed at dipper at times t1, t2, t3, t4, and t5, the control system 110 analyzes the weight sensor telemetry data from the truck 104 and determines that dippers at t1 and t3 emptied material loads into the truck 104, that dipper at t4 emptied a small residual amount of material into the truck 104, and that dippers at t2 and t5 did not empty material loads into the truck 104. Additionally, if a second excavator 102b performed dippers at t6, t7, t8, t9, and t10, the control system 110 analyzes the weight sensor telemetry data from the truck 104 and determines that the dippers at t6, t8, and t10 emptied material loads into the truck 104, and that dippers t7 and t9 did not empty material loads into the truck 104. The control system 110 in this example further analyzes the dipper sizes associated with the first excavator 102a and the second excavator 102b. In this example, the dippers from the second excavator 102b are larger in size than the dippers from the first excavator 102a, and the control system 110 determines that the second excavator 102b has a larger bucket capacity and/or an operator that fills the bucket to a higher level than the operator of the first excavator 102a.

In still other examples, cameras, microphones, motion sensing devices, and other types of environmental sensors from one or more machines in the environment 100 are used to confirm or verify the machine telemetry data received from another machine. For instance, the control system 110 may analyze motion data, image data and/or audio data captured by a first machine to confirm or revise the machine telemetry data from another machine, such as visual or audio verification of the material dumped by an excavator 102 into a truck 104, etc. As an example, referring again to the telemetry data chart 200 in FIG. 2, the control system 110 receives image data and/or video data captured by camera(s) of the excavators 102, truck 104, and/or other cameras installed in environment 100, corresponding to times t1 to t12. For any or all times t1 to t12, control system 110 analyzes the image data and/or video data to determine whether material was dropped into the truck 104 at that time, and/or which excavator 102 dropped the material into the truck 104 at that time.

Additionally or alternatively, the control system 110 receives data from external data sources 116, in addition to the sensor data received from machine(s) 102-108. For instance, an external data source 116 provides more detailed material attribute data for the environment 100. In an example, the control system 110 receives an updated material attribute information which is specific to a location (e.g., a particular location within a mining block) from which materials have been extracted by a machine 102-108 and is more detailed with respect to the composition of materials, impurities, etc. at the location. In some examples, the updated material attribute information includes more detailed material grade data collected during exploratory drilling. During exploratory drilling, a pattern of holes are drilled across the mining block and an assay is performed on the material extracted from each drill hole. The data received from external data sources 116 includes information about desirable grades (e.g., gold, iron, silver, copper, etc.) and/or undesirable grades (e.g., impurities). In some examples, the data also includes material modifier data and/or other characteristics of the material (e.g., hard, soft, wet, dry, clay, sand, etc.) addition to information derived from exploratory testing, the data from external data sources 116 also includes weight measurements received from weigh stations that have weighed trucks 104, wheel loaders 108, or other machines prior to dumping materials into a crusher 106. In such examples, the data from the external data source 116 (e.g., the weigh station) provides additional payload measurements for trucks 104, wheel loaders 108, and other hauling machines. In some cases, data from external data sources 116 modifies or replaces the material data and/or mining block data stored by the control system 110. For instance, control system 110 may maintain a block model mapping the locations of materials in a mining block. However, blasting at the mining block changes the material locations, and certain external data sources 116 include model systems to determine how and where materials move as a result of the blasting. In this example, the external data sources 116 provide improved identification of the material attributes and different locations of the mining block following the blasting. In still other examples, external data sources 116 include video systems used to inspect the beds of trucks 104 or other machines and estimate the amount of "carry back" material (e.g., material stuck to the floor of the truck bed that was not dumped into the crusher 106) Using the additional material grade data, the control system 110 determines and/or updates the material characteristics of the load and/or blend extracted by the machines 102-108. For instance, the control system 110 performs a first determination of a material load or blend grade based on the machine sensor data (e.g., mining block locations, amounts of materials extracted from each location, etc. and then a second updated determination for the material load or blend grade based on the additional detailed material grade data received from the external data source 116.

Additionally or alternatively, the control system 110 may execute a trained machine-learning model using any combination of the data received by the control system 110 described herein (e.g., machine telemetry data, site-wide machine sensor data, external material attribute data, etc.). Various machine-learned models are trained using any combination of input data, to output one or more events determined by the model (e.g., material extraction events, material movement events, material processing events, etc.), and/or any material characteristics associated with a load or blend. By way of illustration, a first example of a machine-learned model receives telemetry data from an excavator 102, and analyzes the timing patterns of dippers, cab movements, arm movements, and the like, determine which of the dippers likely emptied material into a truck 104 and which did not. As a second example, a machine-learned model receives telemetry data from a pusher machine and analyzes the forward/backward movement patterns of the pusher, the changes in direction, pauses, blade positions of the pusher, etc., to determine when the pusher is pushing materials and when the pusher is not.

Figure 3:
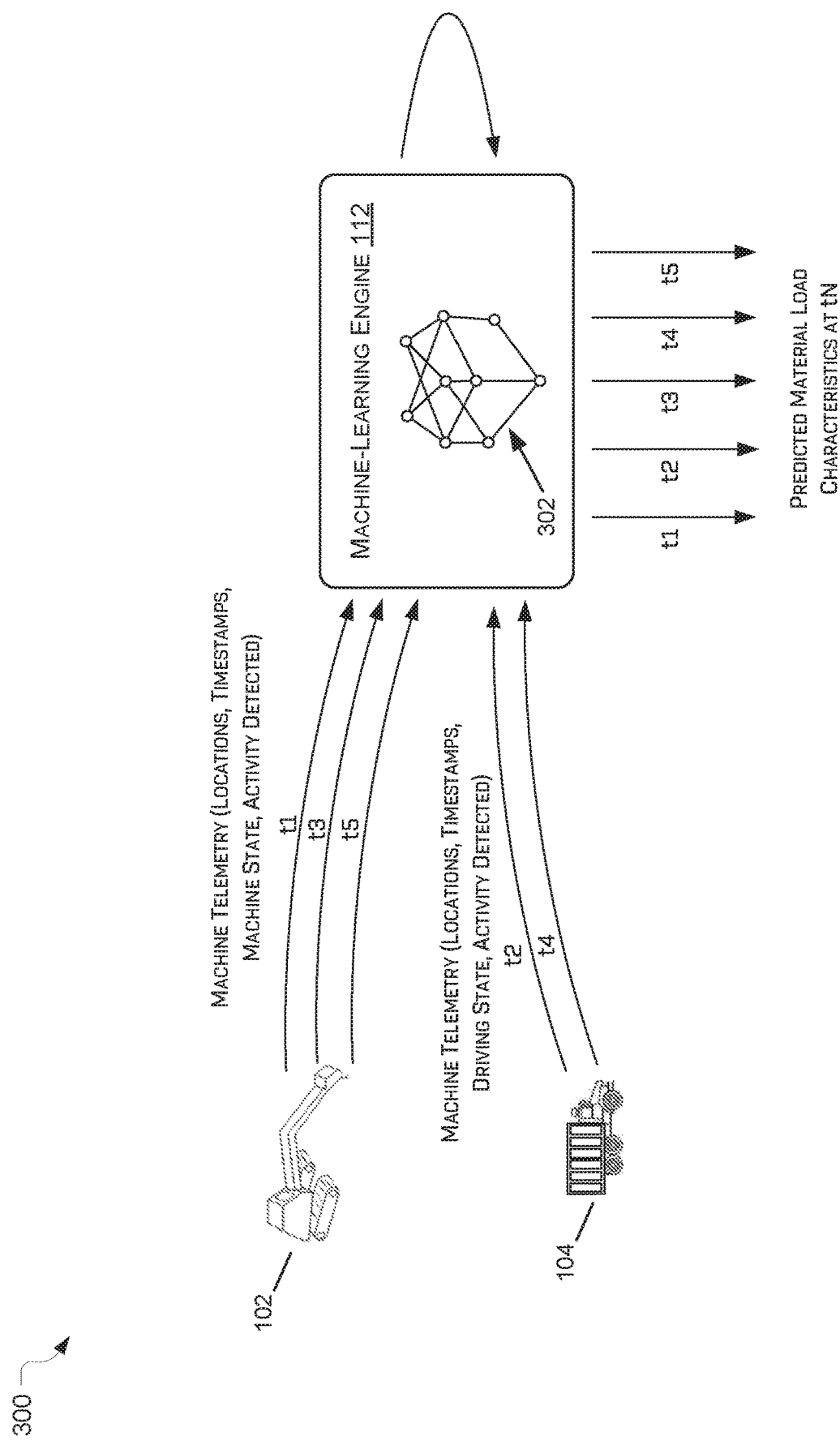
FIG. 3 is an example system including a machine-learning engine receiving data from machines, in accordance with one or more examples of the present disclosure.

For instance, referring briefly to FIG. 3, example system 300 shows an excavator 102 and a truck 104 providing machine telemetry data to a machine-learning engine 112. In this example, the machine-learning engine 112 includes one or more models 302 trained to receive data captured by various machines 102-108. The control system 110 receives site-wide machine telemetry data from various machines 102-108, provides the telemetry data as input to the trained model(s) 302, and receives the output from the trained models) 302. The output of the trained model(s) 302 includes predictions of one or more characteristics of a material load, based on the telemetry data from the machines 102-108. In some examples, the output of trained model(s) 302 includes a prediction (e.g., a probability) that a dipper from an excavator 102 dropped material into a truck 104. Various predictions output by trained model(s) 302 also include the amount of material (e.g., size or mass) dug by an excavator 102 that was dropped into a truck 104, the percentages of the material load in a truck 104 that were dug by different excavators in the environment 100, the percentages of material modifiers in a material load, etc. In some examples, trained model(s) 302 also output predictions that identify the particular loading tool (e.g., excavator 102) that loaded a truck 104, as well as output predictions of the amount and type of material loaded into the truck 104. In such examples, the machine-learning engine 112 receives inputs from multiple trucks 104, and produces a result indicating that a particular loading tool loaded materials with particular material attributes into the truck 104.

As shown in this example, the machine-learning engine 112 receives input data from different machines 102-108 at multiple times (e.g., t1 to t5), and outputs different predictions regarding the characteristics of material load(s) in response to the input data received at the different times. To illustrate, the machine-learning engine 112 receives input data at time t1, corresponding to first telemetry data captured by an excavator 102. The first telemetry data includes location data, timestamps, machine state data, and movement/activity data, for the excavator 102 during a time window prior to t1. Based on the first telemetry data received at time t1, the machine-learning engine 112 outputs first prediction(s) of one or more characteristics of the material load extracted by the excavator 102 (e.g., amount of material extracted, extraction location(s) at the site, amount dropped into a truck, etc.). At time t2, the machine-learning engine 112 receives additional input data, corresponding to second telemetry data captured by a truck 104 operating at the same proximate location and time as the excavator 102. The second telemetry data received at t2 is provided as input to trained model(s) 302, and the machine-learning engine 112 outputs updated prediction(s) of characteristics of the material load extracted by the excavator 102 and/or hauled by the truck 104, where the updated prediction(s) at time t2 are based on both the telemetry data received from the excavator 102 at time t1 and the telemetry data received from truck 104 at time t2. At time t3, the machine-learning engine 112 receives third telemetry data from the excavator 102, provides the third telemetry data as input to the trained model(s) 302, and receives as output updated prediction(s) of characteristics of the material load extracted by the excavator 102 and/or hauled by the truck 104, where the updated predictions are based on the telemetry data received at t1, t2, and t3, and so on.

The model(s) executed by the machine learning engine 112 be generated/trained based on training data captured based on a historical trend of monitoring the environment 100 and/or similar environments (e.g., other mining sites), in some cases, training data is generated in environments via a variety of data acquisition means (e.g., video monitoring, advance machine sensors, separate site monitoring sensors, and/or manual monitoring by operators, etc.). Various machine learning techniques are employed to train machine-learned models based on the training data. In some examples, machine learning techniques are employed to perform predictions of characteristics of material loads and/or machine activities, in environments 100 where less machine telemetry data is available to the control system 110, such as environments having fewer machine sensors, fewer site monitoring devices, no video monitoring/surveillance, no manual load monitoring/recording by operators, etc.

As discussed above, the control system 110 receives data from different data sources at different times and/or in different phases. In some implementations, a control system 110 receives first machine telemetry and/or sensor data from a first machine 102-108 indicating an operation performed by the first machine (e.g., a material extraction operation, transportation operation, or processing operation) in real-time or near real-time with respect to when that operation was performed by the first machine 102-108. After the first machine telemetry/sensor data is received by the control system 110, additional data is received or generated by the control system 110. In some examples, the control system 110 requests and/or receives site-wide machine telemetry/sensor data from other machines 102-108 in the environment 100. For instance, the control system 110 may request sensor data from other machines 102-108 nearby the first machine 102-108, in response to receiving the initial sensor data from the first machine 102-108. In other examples, site-wide sensor data is periodically transmitted to the control system 110 (e.g., every 2 seconds, 5 seconds, 10 seconds, . . . , 1 minute, 5 minutes, etc.). Additionally, at some time after the control system 110 receives the initial machine telemetry/sensor data, an external data source 116 transmits updated material attribute data to the control system 110. In some cases, the control system 110 transmits requests including the mining block location, dig path, and/or GPS coordinates of the excavator, to one or more external data sources 116 to request the detailed material attribute data (e.g., material grades, payload, material modifier, source block, locked destination, and/or any other material attribute associated with the extraction location). In other cases, an external data source 116 transmits material attribute data to the control system 110 independently. Thus, the control system 110 receives detailed material attribute data for a mining location from external data sources 116, either before, shortly after, or long after an excavator extracts material from that location. Additionally, for any trained models executed by the machine-learning engine 112, there is a short delay (e.g., 1-2 seconds) for during execution of the models, before the results of the model are received by control system 110.

Because the control system 110 receives the above-described data at different times, the control system 110 may implement a multi-phase approach to the task of determining material load and blend characteristics, and/or to the task of determining control operations for the machines 102-108 in the environment 100. As described herein, a "multi-phase approach" includes multiple different determinations (e.g., an initial determination, then one or more updated determinations) for material load characteristics, material blend characteristics, and/or controlling operations for machines 102-108.

As an example, during a multi-phase implementation, the control system 110 initially receives first data associated with a first material load (e.g., telemetry data from a first machine 102-108 reporting an operation or event). In response to receiving the first data, so as not to leave any machines 102-108 idle at the worksite for an extended period, the control system 110 analyzes the first data, determines one or more characteristics of the first material load, and determines new or updated characteristics for a blend of material that includes (or will include) the first material load, and then determines and transmits control instructions (or operating instructions) for one or more of the machines 102-108 in the environment. In some examples, the control system 110 determines the characteristics of the first material load (e.g., percentages of particular materials, percentages of impurities, amounts of material modifiers, etc.), based on the telemetry data from the first machine (e.g., number of dippers, weight of material in truck, etc.) and material attribute data associated with the location (e.g., mining block and dig location) from which the first material load was excavated. After determining the characteristics of the first material load, the control system 110 determines the characteristics of the associated material blend by combining (e.g., aggregating and/or averaging) the characteristics of the first material load with the corresponding characteristics of the material blend (e.g., percentages of particular materials, percentages of impurities, amounts of material modifiers, etc.) prior to the addition of the first material load into the blend of material. The control system 110 compares the new or updated characteristics of the material blend to a set of predefined target characteristics for the material blend, including optimal amounts or percentages, and/or target ranges of certain materials, impurities, modifiers, etc. Depending on the comparison of the updated blend characteristics to the predefined target blend characteristics, the control system 110 determines which materials are added to the blend subsequently to maintain the blend at the predefined target characteristics for the blend.

As an example, if a blend has a target range of a particular material (e.g., gold), and the first material load includes a smaller percentage of gold than the target range, the control system 110 uses the current size of the blend and the first material load to determine an updated percentage of gold within the blend (e.g., after the addition of the first material load to the blend). If the updated percentage of gold within the blend falls below the target range for the blend, the control system 110 determines that a subsequent material load added to the blend should include a greater percentage of gold than the target range, in order to raise the overall percentage of gold within the blend back into the target range. In some examples, the control system 110 receives or determines a set percentage of different materials that are to be included in the material blend. For instance, the control system 110 determines that, within a mining site, a 50-50 blend of a low-grade ore and a high-grade ore is processed to produce a specific grade ordered by a customer. Other types of material blending techniques include discrete blending and continuous blending. In discrete blending, the control system 110 controls the material blend so that it includes a set percentage of material with different characteristics. For example, a mining operation may blend materials with two (or more) different royalty payments to achieve minimum committed royalty payments. In continuous blending, the control system 110 controls the material blend to maintain one or more grades (e.g., gold) within a certain range (or ranges). For example, in response to an off-site processing plant requesting material with a specific gold content, the control system 110 controls the blend to maintain the gold control within the requested range. In this example, the control system 110 issues one or more operating instructions to machines 102-108, to perform actions that raise or lower the percentage of gold within the blend. For instance, in some cases the control system 110 determines one or more loads to send to a crusher 106, and other loads to send to a stockpile, dump, or other material destination. In other cases, the control system 110 transmits instructions to an excavator 102 to extract materials from certain mining blocks and dig locations with high-grade ore, or transmit instructions to a dispatch or assign truck 104 to receive a material load with high-grade ore and carry the load to a crusher that feeds the blend, etc. In still other cases, the control system 110 transmits instructions to wheel loaders 108 to move materials from a stockpile to a crusher 106 to adjust the material blend.

Continuing with this example, after receiving the first data from the first machine 102-108, determining characteristics for the associated material load or blend, and transmitting operating instructions to machines 102-108, the control system 110 receives additional data (e.g., second data, third data, fourth data, fifth data, etc.) relating to the same material load or blend. The additional data, received after the first data, may include any of the data described herein that is potentially received at the control system 110. By way of an example, the second data received at a second time includes site-wide machine sensor data. Third data received at a third time includes outputs from trained machine-learned models executed using the first and/or second data. Fourth data received at a fourth time includes detailed material attribute data from an external data source 116. Fifth data received at a fifth time includes manual feedback or status data input by a machine operator, foreman, or supervisor of the environment 100. When the control system 110 receives new data relating to the same material load(s) or blend(s) associated with the first data, the control system 110 analyzes the cumulative data received up to that time and determines, based on the cumulative data, one or more updated characteristics of the material load and/or blend. For example, if the control system 110 receives additional data changing the previously determined characteristics of a first material load that was added to the blend (e.g., the size of the load, the excavator 102 that dug some or all of the load, the extraction location of the load, the material composition of the load, the modifiers or impurities present in the load, etc.), then the control system 110 re-calculates the characteristics of the material blend based on the updated characteristics of the load (e.g., by aggregating and/or averaging the characteristics of the load with the corresponding characteristics of the material blend). Using the updated material characteristics of the material load and the material blend, the control system 110 determines and transmits updated operating instructions for one or more of the machines 102-108 in the environment. In some cases, the control system 110 changes or cancels the operating instructions previously transmitted by the control system 110 based on earlier data (e.g., an assignment of an excavator 102 to a dig path, the assignment of a truck 104 to a crusher 106, etc.), in response to receiving and analyzing the additional data at a later time (e.g., re-routing the excavator 102 or truck 104 to a stockpile or different crusher 106).

Additionally, it is contemplated that the machine operating instructions determined by the control system 110, either once or at multiple times during a multi-phase implementation, may be directed to any of the machines 102-108 in the environment 100. In an example, the control system 110 assigns a first truck 104 to a first crusher 106, in response to a first material blend determination. Then, after a subsequent change to the material blend determination based on additional data received by the control system 110, the control system 110 re-routes the first truck 104 to a different processor, assigns a second truck 104 to a processor, directs an excavator 102 to a mining site, or performs any combination of operations for any of the machines 102-108.

Figure 4:
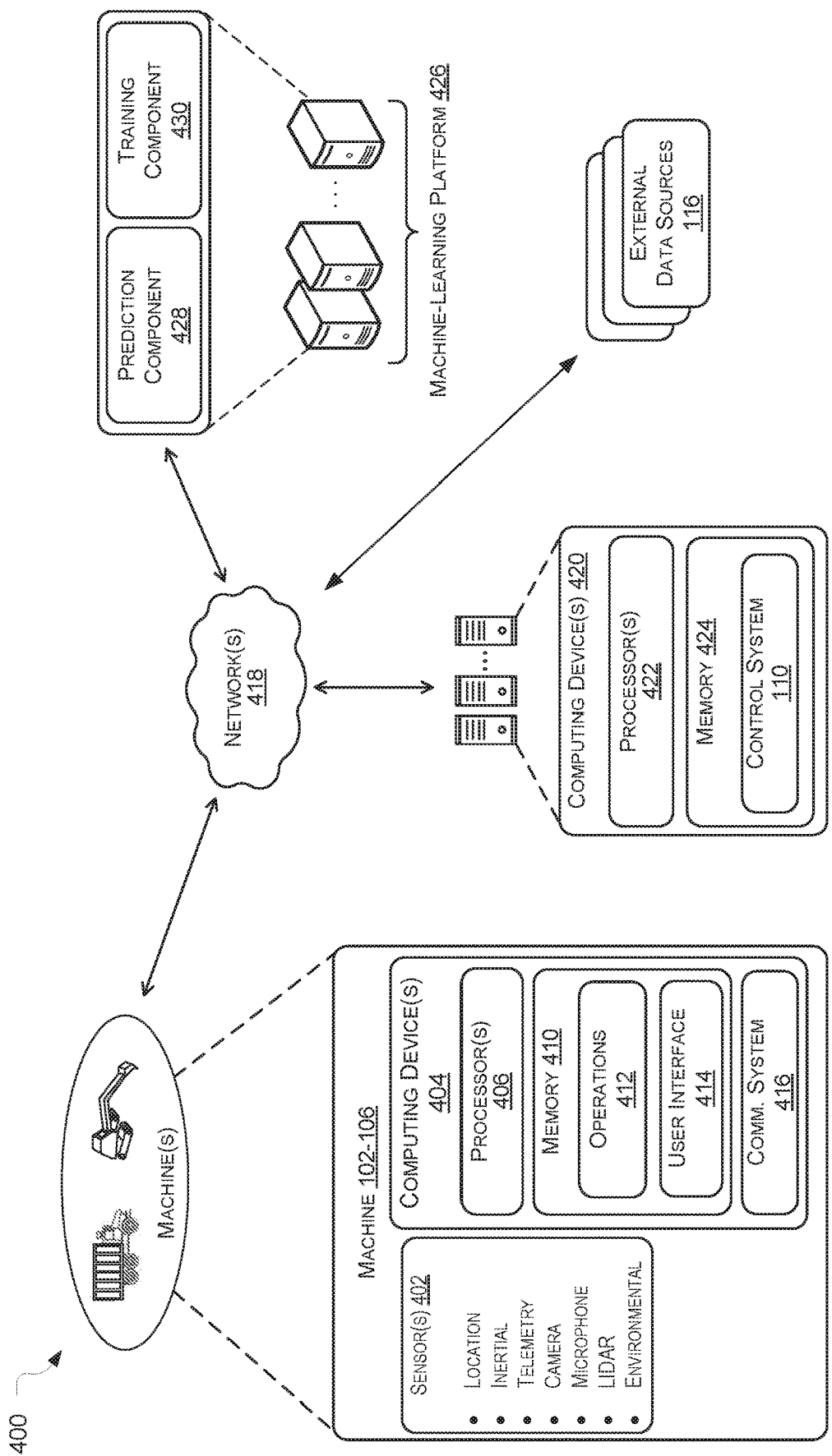
FIG. 4 is an example computing architecture for monitoring and controlling machines in an environment, in accordance with one or more examples of the present disclosure.

FIG. 4 is a block diagram illustrating an example system 400 for monitoring and controlling machines 102-108 in an environment according to examples described herein. As shown in this example, the control system 110 is implemented within a computing device(s) 420 configured to communicate with one or more machines 102-108, external data sources 116, and a machine-learning platform 426. In at least one example, the system 400 includes one or more computing device(s) 420 which include the control system(s) 110 in some implementations. The computing device(s) 420 include one or more processors 422 and memory 424 communicatively coupled with the processor(s) 422. In the illustrated example, the memory 424 of the computing device(s) 420 stores the control system 110.

The system 400 also includes one or more machines 102-108 operable in an environment. As discussed above in FIG. 1, the machine(s) 102-108 include any type of industrial machine, transportation machine, or construction equipment configured to operate in an environment, including but not limited to an excavator 102, a truck 104, and a crusher. A machine 102-108 includes various sensors 402 and one or more computing device(s) 404. Computing device(s) 404 include one or more processors 406 and memory 410 communicatively coupled with the processor(s) 406. In the illustrated example, the memory 410 of the computing device(s) 404 stores several on-board software-based systems of the machine 102-108, including the operations component 412 and user interface 414.

Although the systems and components of machines 102-108 and computing device(s) 420 are illustrated, and will be described below, as separate components, functionality of the various systems may be attributed differently than discussed. Moreover, fewer or more systems and components may be utilized to perform the various functionalities described herein. Furthermore, though depicted in FIG. 4 as residing in memory 424 for illustrative purposes, it is contemplated that the control system 110 is stored on machines 102-108, or stored at a different remote location accessible to the computing device(s) 404 and 420 (e.g., stored on, or otherwise accessible by, memory remote from the computing device(s) 404 and 420).

In various examples described herein, the control system 110 receives and analyzes data from the machines 102-108, external data sources 116, and/or machine-learning platform 426. Based at least in part on telemetry data, sensor data, and/or other data received by the control system 110, the control system 110 determines one or more characteristics of the material load(s) or blend(s) associated with received data, and further determines operating instructions for machines 102-108 based on the characteristics of the material load(s) or blend(s).

On machine(s) 102-108, the sensors 402 include telemetry systems to detect machine operations and status, as well as sensors disposed on the machine 102-108. For instance, additional sensor(s) 402 include location sensors (e.g., GPS, compass, etc.), inertial sensors (e.g., inertial measurement units, accelerometers, magnetometers, gyroscopes, etc.), cameras (e.g., RGI, UV, IR, intensity, depth, etc.), microphones, wheel encoders, environment sensors (e.g., temperature sensors, humidity sensors, light sensors, pressure sensors, etc.), LIDAR sensors, RADAR sensors, ultrasonic transducers, SONAR sensors, etc. Sensors 402 may include multiple instances of each of these or other types of sensors. For instance, a machine 102-108 in an environment 100 may have multiple cameras disposed at various locations about the exterior and/or interior of the machine. The sensors 402 provide input to the computing device(s) 404. Additionally, and/or alternatively, the sensor(s) 402 send sensor data, via communication systems 416 and/or network(s) 418, to the computing device(s) 420 at a particular frequency, after a lapse of a predetermined period of time, in near real-time, etc.

In some examples, the computing device(s) 420 receives raw sensor data and/or processed sensor data (collectively "sensor data") from the sensor(s) 402. The computing device(s) 420 send the sensor data to the control system 110, which is designed and implemented as described herein to monitor material extraction, movement, and processing, and to determine recommendations for controlling machines 102-108. The computing device(s) 420 includes processor(s) 422 and memory 424, and in some examples, includes one or more servers or other computing devices, any or all of which include one or more processors 422 and memory 424 storing computer executable instructions to implement the functionality of the control system 110 discussed herein.

In addition to receiving sensor data captured by sensor(s) 402, the control system 110 also receives additional related data (e.g., related to the same machine 102-108 and/or same material load or blend), captured by one or more sensors associated with a different machine in the same environment 100, external data sources 116, and/or prediction component 428. The sensor(s) 402 also include one or more sensors permanently mounted in the environment 100 and/or mobile sensors (e.g., not permanent) used in the environment 100 due to machine operation, construction, and the like. For example, the sensor(s) 402 include one or more weather sensors configured to determine a temperature, detect precipitation, and/or determine humidity in an operating environment 100, and are associated with a particular machine 102-108, location, or with the site in general.

Machines 102-108 also include communication system(s) 416 that enable communication between the computing device(s) 404 and other local or remote device(s). For instance, the communication system(s) 416 facilitate communication with other computing devices such as the computing device(s) 420, machine-learning platform 426, and the external data sources 116, and/or one or more networks, such as the network(s) 418. In an example, the communication system(s) 416 enables Wi-Fi-based communication such as via frequencies defined by the IEEE 802.11 standards, short range wireless frequencies such as BLUETOOTH®, other radio transmission, or any suitable wired or wireless communications protocol that enables the respective computing device to interface with the other computing device(s).

In some implementations, the on-board computing device(s) 404 send information, such as sensor data, to the computing device(s) 420, via the network(s) 418. The computing device(s) 420 can receive the sensor data from the computing device(s) 404 and/or directly from the sensor 402 and can perform various functions attributed to the control system 110 based at least in part on the received sensor data.

In some examples, the control system 110 accesses one or more machine learned models (e.g., data models) from the machine-learning platform 426, and executes the trained model(s) to output the recommendation(s) for determining load and blend characteristics, and/or determining operating instructions for machines 102-108. In some examples, some or all components of the machine-learning platform 426 are implemented remotely, as shown in FIG. 4. Additionally or alternatively, the components of the machine-learning platform 426 are implemented within the control system 110 and/or machines 102-108 in some examples. For instance, in an example, the prediction component 428 is integrated into the control system 110 (and/or individual machines 102-108), while the machine-learning training component 430 is implemented as a separate remote processing system in the machine-learning platform 426.

The data model(s) are trained utilizing training data including telemetry data and other sensor data, operating parameters associated with a machine, production data and associated times, and the like. In such examples, the prediction component 428 and/or training component 430 data model(s) are configured to receive as input sensor data associated with a machine 102-108 (e.g., or a location data, a material load, etc.) and output data regarding the characteristics of the material and/or recommendation(s) for controlling the machines 102-108 to manage the material load or a material blend in the environment 100.

In at least one example, the machine-learning platform 426 includes a training component 430 configured to train the data model(s) to output material characteristics and/or recommendations for machine operating instructions. In some examples, the training component 430 periodically (e.g., daily, weekly, monthly, etc.) and/or continuously updates the data model(s) based on updated training data comprising sensor data, machine operating parameters, and production data associated with machines 102-108 in the environment 100, in various examples, the training component 430 updates the data model(s) responsive to receiving data indicating a different set of target material characteristics for loads or blends, and/or different optimization criteria for the operations of the machines 102-108 (e.g., minimizing material transportation costs, minimizing mixing costs, maximizing blend quality, etc.) from the control system 110.

In various examples, the prediction component 428 uses one or more trained models to surface predictions and/or recommendations regarding material characteristics and machine controls. In some examples, recommendations for controlling machines 102-108 are presented to an operator of the machine 102-108 via a user interface 414. For instance, the user interface 414 of the machine 102-108 surfaces a recommendation provided by the control system 110 (e.g., a specific dig location), providing a means by which an operator of the machine 102-108 reviews and follows or does not follow the operating recommendation. In such examples, the functioning of the machines 102-108 may be improved, such as by reducing an amount of input that an operator must process via the user interface 414. In some examples, the machine 102-108 transmits a message back to the control system 110 reporting the operation of the machine 102-108 after receiving and surfacing the recommendations for the operator, to provide a report with data indicating whether the operation of the machine was consistent with the operational recommendations.

In some examples, responsive to receiving operating instructions from the control system 110, the operations component 412 automatically updates the operational mode of the machine 102-108. In some examples, the recommendation from the control system 110 includes an instruction to set the operation mode of the machine 102-108, responsive to receipt of an indication of acceptance via the user interface 414. In such examples, the control system 110 causes the operations component 412 to set the operation mode of the machine 102-108 responsive to the input of acceptance. For example, an autonomous machine 102-108 may be configured to automatically set operational mode provided by the control system 110.

In some examples, the operating instructions (or operational control instructions) provided by the control system 110 to the machine 102-108 include an assignment, dispatch location, material extraction parameters (e.g., mining block, location, tools, extraction depth, etc.) and/or recommendation of a path for the machine 102-108 to follow in the environment 100. A recommended path includes a direction of travel associated with maximizing efficiency at the environment 100. In various examples, the control system 110 causes a representation of the operating instructions to the surface via the user interface 414. For instance, a recommended driving path, dig path, or extraction technique or dump technique includes headings for an operator to maintain and/or additional machine controls to be engaged. In some examples, the control system 110 causes the machine 102-108 to surface an alert (e.g., aural warning, visual warning on a display, etc.) to the operator via the user interface 414 indicating that a current operational status of the machine 102-108 (e.g., current location, heading, path, trend, and/or operational mode, etc.) may cause the machine 102-108 to deviate from the recommended operating instructions provided by the control system 110. In some examples, the alert (e.g., warning) is surfaced (or emitted) based on the operator inputting an indication of acceptance of the operating instructions. In such examples, the alert system is activated based on an acceptance by the operator of the operating instructions. In examples in which the machine 102-108 is autonomous or semi-autonomous, the control system 110 sends an instruction for the computing device(s) 404 to control the machine 102-108 based on the operating instructions. Responsive to receiving the operating instructions, the computing device(s) 404 automatically controls the machine 102-108 via operations component 412, according to the recommended operating instructions received from the control system 110.

The processor(s) 406 of the computing device(s) 404, and the processor(s) 422 of the computing device(s) 420 include any suitable processor capable of executing instructions to process data and perform operations as described herein. By way of example and not limitation, the processor(s) 406 and 422 comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices are considered processors in so far as they are configured to implement encoded instructions.

The memory 410 and the memory 424 are examples of non-transitory computer-readable media. The memory 410, 424 store an operating system and/or one or more software applications, instructions, programs, and/or data to implement the methods described herein and the functions attributed to the various systems. In various implementations, the memory are implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein include many other logical, programmatic, and physical components, of which those shown in the accompanying figures are merely examples that are related to the discussion herein.

It should be noted that while FIG. 4 is illustrated as a distributed system, in alternative examples, components of the computing device(s) 404 are associated with the computing device(s) 420 and/or components of the computing device(s) 420 are associated with the computing device(s) 404. Moreover, although various systems and components are illustrated as being discrete systems, these examples are illustrative and more or fewer discrete systems may perform the various functions described herein.

Figure 5:
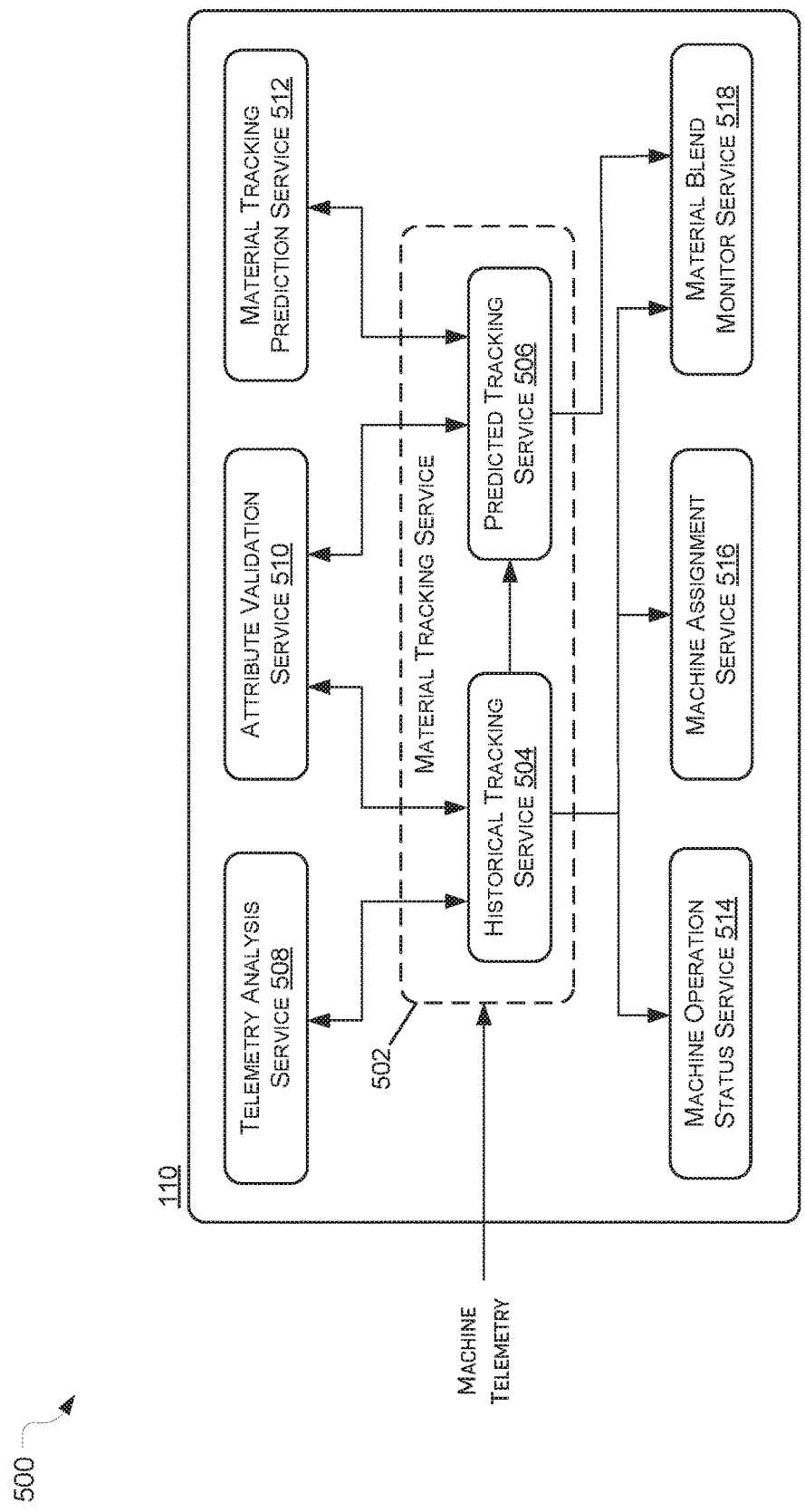
FIG. 5 is a block diagram of a control system and related components for monitoring and controlling machines in an environment, in accordance with one or more examples of the present disclosure.

FIG. 5 is a block diagram of a software architecture for an illustrative control system 110, implemented as shown to monitor and control machines 102-108 in an environment 100. In this example, the control system 110 includes a material tracking service 502 configured to operate between a set of external services (e.g., telemetry analysis service 508, attribute validation service 510, material tracking prediction service 512) and a set of internal services (e.g., machine operation status service 514, machine assignment service 516, and material blend monitor service 518). The material tracking service 502 is used in multi-phase implementations, by providing data to the requesting internal services (e.g., 514-518) in real time or near real time, based on the current state of multi-phase data received from machines 102-108 and/or external services (e.g., 508-512) over a longer time period.

As shown in FIG. 5, the material tracking service 502 includes separate services for maintaining a historical timeline and a predicted timeline. The historical tracking service 504 stores data associated with a set of material tracking events that have been performed by machines 102-108 in the environment. For instance, the historical tracking service 504 receives telemetry data indicating that a material-related operation has been performed by a machine 102-108 (e.g., extraction, transportation, or processing of material). Based on the telemetry data, the historical tracking service 504 generates a timeline of entries representing the material tracking events that have been performed by loading tools (e.g., excavators 102), trucks 104, crushers 106, wheel loaders 108, or any other machine 102-108 in the environment. An event in the historical timeline may be stored as an instantiated class object including a set of attributes that define the characteristics of the material tracking event. Examples of these attributes are described below in more detail in reference to FIGS. 6 and 7.

The material tracking service 502 also includes a predicted tracking service 506. In contrast to the historical tracking service 504, the predicted tracking service 506 stores and maintains a timeline of material tracking events that have not yet occurred in the environment 100, but which are predicted to occur. In some examples, the predicted tracking service 506 detect source events received at the historical tracking service 504, and determines one or more predicted future events based on the historical source events. For instance, the predicted tracking service 506 adds a predicted event to the predicted time, in response to a truck 104 being loading and assigned. Additionally or alternatively, the predicted tracking service 506 uses active or dynamic recipes, predicted dig paths, and/or trained machined-learned models to predict future material tracking events based on the machine telemetry data.

The telemetry analysis service 508 analyzes the machine telemetry received by the material tracking service 502 to more accurately determine which machine telemetry operations are associated with a material load. For instance, telemetry analysis service 508 correlates loading tools events (e.g., dippers from an excavator 102) with truck load events from one or more trucks 104. The telemetry analysis service 508 uses machine-learning based or artificial intelligence (AI) based techniques to validate the machine telemetry data, as described above.

The attribute validation service 510 analyzes loading tool events (e.g., dippers) to more accurately identify the attributes associated with the event. In various examples, the attribute validation service 510 determines whether the mining block and/or material loaded include custom attributes based on the associated dig location. The validation of event attributes by the service 510 includes accessing external systems including data warehouses, machine-learning, and/or other third-party systems.

The material tracking prediction service 512 periodically updates the predicted timeline(s) maintained by the predicted tracking service 506 for machines 102-108 (e.g., loading tools, trucks, and processors). As described above, the service 512 uses various methods, alone or in combination to predict material tracking events including historical events (e.g., last loaded block or material), active recipes, predicted dig paths, and/or machine learning.

The machine operation status service 514 uses machine-learning based techniques and/or other artificial intelligence techniques to more accurately determine the activities of machines 102-108, including queuing times, spotting times and loading times. In some examples, the machine operation status service 514 also performs production recording to automatically synchronize the characteristics of material loads/blends with the timelines maintained by the material tracking service 502. The machine assignment service 516 feeds assignment data including the current attributes of a material load on a truck 104 (e.g., mining block material, material modifiers, destination, etc.), so that the truck 104 is given an appropriate assignment based on the corrected attributes of the loaded material.

The material blend monitor service 518 monitors and controls blend compliance for one or more material blends within the environment 100. In some examples, the material blend monitor service 518 determines a set of current blend characteristics and compliance with a target blend range, based on the historical timeline events maintained by the historical tracking service 504. Additionally, the material blend monitor service 518 predicts future blend characteristics and compliance using the predicted future events on the predicted timeline maintained by the predicted tracking service 506.

As noted above, the material tracking service 502 supports multi-phase implementations, in which data is received from different data sources machines 102-108, external data sources 116, trained machine-learning models, etc.) during different time periods. In this example, the historical tracking service 504 and predicted tracking service 506 maintain timelines storing historical and predicted material tracking events, respectively. Material tracking events include sets of attributes, which are updated after the instantiation of the event, based on additional data received from services 508, 510, and/or 512. Thus, the material tracking service 502 improves the efficiency and flexibility of the machine monitoring and control techniques, by using the combination of historical and predicted timelines for material tracking events, either of which can be updated at any time so that data is provided to requesting internal services (e.g., 514-518) in real time or near real time, based on the current state of multi-phase data received from machines 102-108 and/or external services (e.g., 508-512) over a longer time period.

Referring now to FIG. 6, a table 600 is shown illustrating a set of example attributes for material tracking events. As discussed above, when the historical tracking service 504 or the predicted tracking service 506 determines a material tracking event (e.g., in the historical event timeline or in the predictive time), a new material tracking event is created. In some examples, material tracking events are implemented as instantiations of an event class object and/or entries in a table, in either implementation, a material tracking event includes a number of associated attributes, including the set of attributes shown in table 600, some or all of which may be used in various examples and implementations.

In some examples, the attributes stored for a material tracking event vary based on the event type. In certain implementations, material tracking events include a base set of attributes, including a unique identifier, a source entry class, and a revision number. The unique identifier is allocated by the counter-party engine that creates the source entry, or is generated if not supplied. Creation of a new event entry is rejected when the entry has the same unique identifier as an existing event entry of the same source entry class. In some examples, source entry classes include a class corresponding to state changes for trucks, a class corresponding to state changes for loaders, a class corresponding to truck and loader dipper, a class corresponding to a truck payload, and a class corresponding to a dump to processor. The attribute source identifies the engine that allocated the identifier, and in some implementations the unique identifier is static (e.g., not be modified after creation). The source entry class attribute identifies the engine that allocated the identifier, and also may be static (e.g., not be modified after creation). In some examples, the revision number starts at one and is incremented each time the source entry is changed.

Additionally, certain material tracking events, such as "dippers" (e.g., bucket emptying operations, payloads, and dumps) require an additional set of attributes, including a timestamp attribute (e.g., either the start time or the end time), a material grade attribute (e.g., grade values for a dipper, or aggregate grade values for a payload, etc.), a material identifier (e.g., a unique identifier for the material), material modifiers (e.g., material modifier data provided by the operator or determined by machine sensors, such as wet material, dry material, etc.), a mass attribute (e.g., the mass of the payload, dipper, or dump), a machine identifier (e.g., the loader identifier for a dipper type, a truck identifier for a payload type, or a processor identifier for a dump type, etc.), a machine category, a material source block identifier (e.g., a unique identifier for the source block), and/or a source block location.

Figure 7:
FIG. 7 is an example table illustrating a set of material tracking event modifications, in accordance with one or more examples of the present disclosure.

Referring now to FIG. 7, a table 700 is shown illustrating a set of example attributes for modifying material tracking events. When a material tracking event is modified by the historical tracking service 504 (e.g., in the historical event timeline) or the predicted tracking service 506 (e.g., in the predictive time), based on newly received data from one or more data sources, a new event modification record is generated. In this example, event modification records include data identifying the machine identifier associated with the modification, a source block identifier, and updated material attribute data. The event modification records in this example also include a source of the modification, for instance, a prediction by the control system 110, additional machine telemetry data, a modification from an operator or controller of a machine 102-108, data from a machine-learning engine 112, or data from an external system 116.

The event modification records in this example also include an override attribute indicating whether or not this record is accepted as an override for the prior record. In some examples, when a material tracking event is updated, the rules engine 114 (and/or configuration settings) determines, for each attribute, if the new value should be used or the old value should be retained. In such examples, the rules engine 114 uses the modification source attribute to determine whether a modification takes precedent over the data in the corresponding historical or predicted material tracking event, and/or over any previous modification records to the data.

When event attributes are retrieved from the historical tracking service 504 and/or predicted tracking service 506, the attributes retrieved will be the last attributes accepted as an override for the related payload. These values can be saved to the legacy material attributes and tables for compatibility with legacy views and reporting, and the historical load event records may be written out to new audit files.

Figure 8:
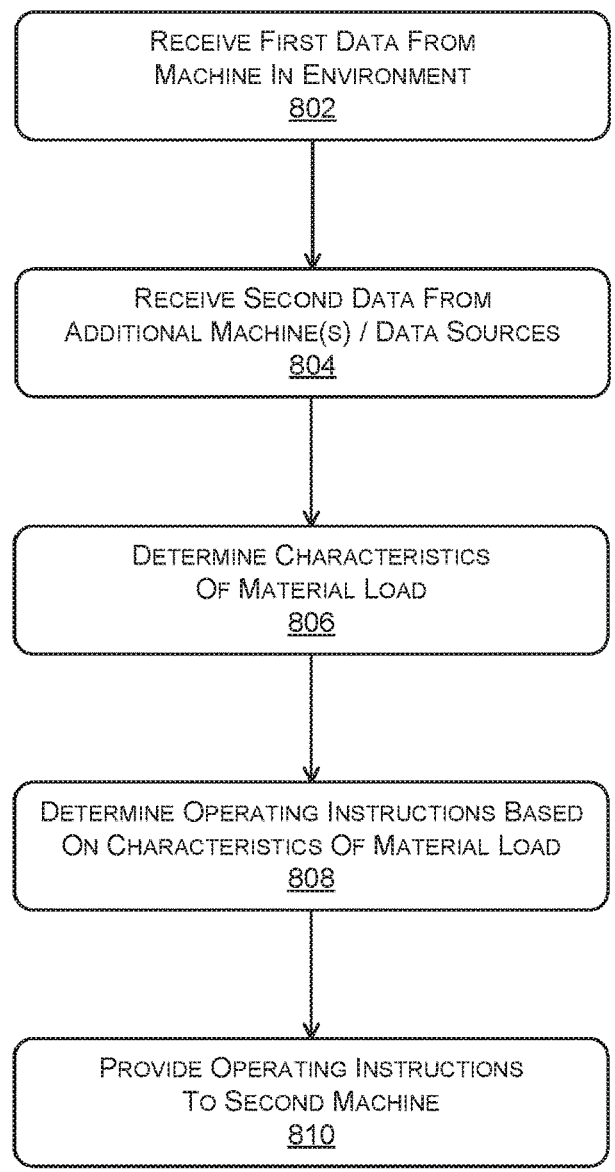
FIG. 8 is a flowchart illustrating an example method of controlling machines in an environment based on determined characteristics of a material blend, accordance with one or more examples of the present disclosure.
Figure 9:
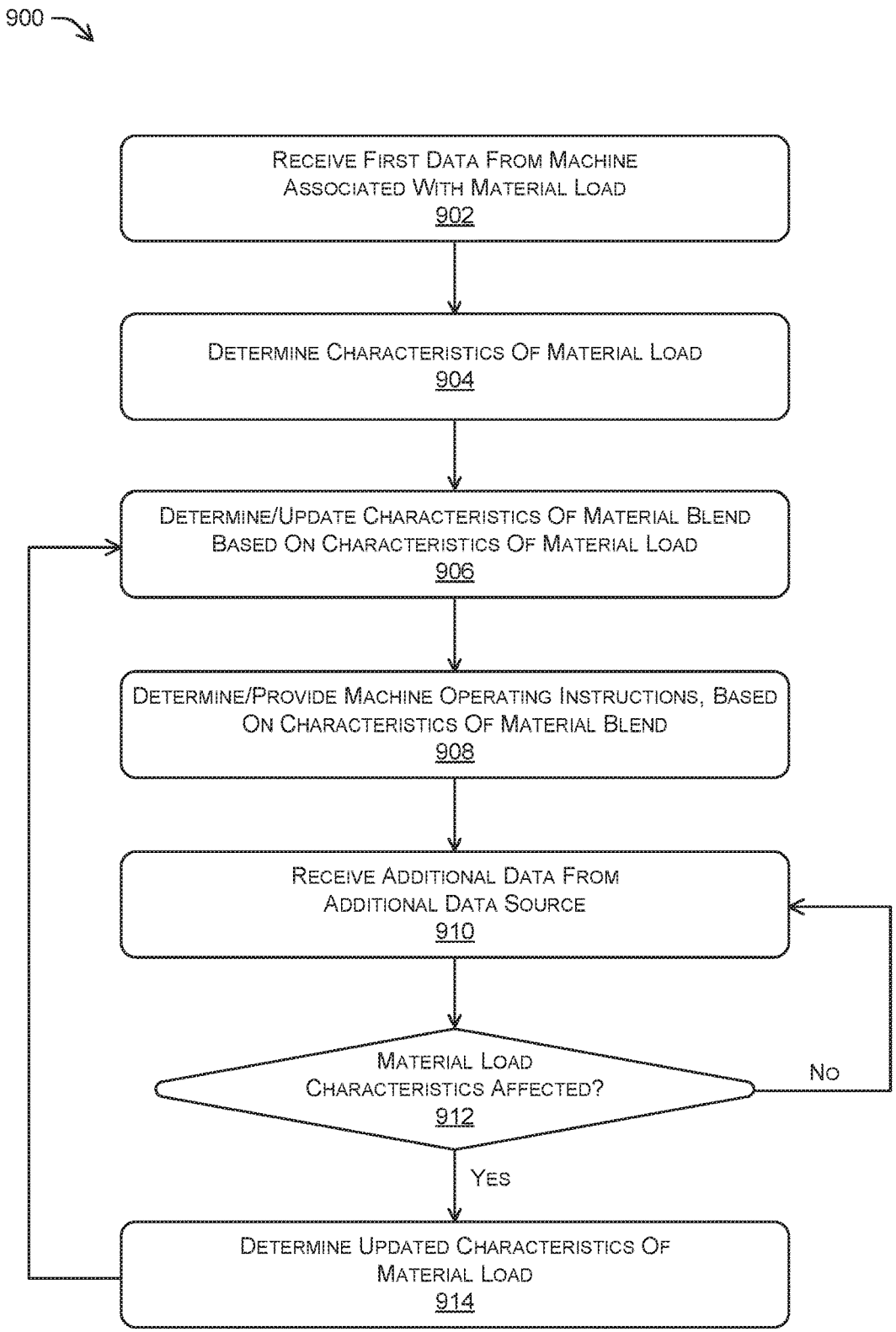
FIG. 9 is a flowchart illustrating an example method of managing a material blend by controlling machines in an environment, in accordance with one or more examples of the present disclosure.

FIGS. 8 and 9 illustrate flow charts depicting example processes 800 and 900, respectively, of the present disclosure for monitoring and controlling machines in an environment. The example processes 800 and 900 are illustrated as a collection of steps in a logical flow diagram, which steps represent operations that can be implemented in hardware, software, or a combination thereof. In the context of software, the steps represent computer-executable instructions stored in memory. When such instructions are executed by, for example, the processor(s) 406, such instructions cause the controller processor(s) 422, sensors 402 and other components of the machines 102-108, the computing device(s) 404 and 420, and/or machine-learning platform 426 to perform the recited operations. Such computer-executable instructions include routines, programs, objects, components, data structures, and the like that perform particular functions or implement particular abstract data types. The order in which the operations are described is not intended to be construed as a limitation, and any number of the described steps can be combined in any order and/or in parallel to implement the process. For discussion purposes, and unless otherwise specified, the processes 800 and 900 are described with reference to the environment 100.

FIG. 8 shows an example process 800 of controlling machines in an environment based on determined characteristics of a material blend. At operation 802, the control system 110 receives first data from a machine 102-108 operating in an environment 100 (e.g., a mine site). The machine 102-108 can be any of the machines described herein, and the first data may include telemetry data or other sensor data including any type of data collected or captured by the machine. In an example, the first data for the machine 102-108 includes data representing any operations performed by the machine controls (e.g., movements or dippers by an excavator 102, driving or dumping by a truck 104, processing by a crusher, etc.).

At operation 804, the control system 110 receives second data from additional data source(s). In some examples, the second data received at 804 includes one or more of site-wide telemetry and/or sensor data received from additional machines 102-108 in the environment, detailed material attribute data received from an external data source 116, and/or output from a trained model received from machine-learning engine 112.

At operation 806, the control system 110 determines one or more characteristics of the material load associated with the machine telemetry received at operation 802. The determination of material load characteristics at operation 806 may be based on the types of data received at operations 802 and 804. For instance, when the control system 110 receives site-wide sensor or telemetry data for other machines 102-108 in the environment 100, the control system 110 correlates the data received from the first machine at operation 802 with sensor/telemetry data from other machines 102-108 received at operation 804. The control system 110 analyzes the correlated data to make determinations about the material that was extracted/transported/processed by the first machine 102-108. In some examples, the control system 110 determines the characteristics of the material load, including percentages of sizes, particular materials, percentages of impurities, amounts of material modifiers, based on the telemetry data from the first machine 102-108 (e.g., number of dippers, weight of material in truck, etc.) and material attribute data associated the location (e.g., mining block and dig location) from which the first material load was excavated. In another example, when the control system 110 receives detailed material attribute data for the extracting location from an external data source 116, the control system 110 determines and/or updates the material characteristics of the load extracted by the machines 102-108 based on the detailed material attribute data. For instance, if the control system 110 receives additional material attribute data that revises or includes further details about the composition of a material load that was previously added to a blend, the control system 110 uses the additional material attribute data to re-calculate the characteristics of the material load (e.g., material grades, percentages or amounts of materials, impurities, modifiers, etc.), and also updates the characteristics of the blend based on the changes in the load.

As another example, when the control system 110 receives the output from trained model(s) from the machine-learning engine 112, the control system 110 receives the trained model output that either confirms or changes the telemetry data received at operation 802.

At operation 808, control system 110 determines operating instructions for one or more machines 102-108, based on the characteristics of the material load determined at operation 806. In some examples, the control system 110 compares the material characteristics of the load with a set of optimal or target characteristics for a load and/or for a blend, and directs machines 102-108 so that the characteristics stay at near the optimal or target characteristics. For instance, if material load was added, or will be added, to a blend having different target ranges of different types of materials, control system 110 calculates the current levels of the different materials based on the previous loads added to the blend, and then determines that the target compositions of subsequent loads for the blend to maintain the percentages at the optimal or target blend levels. Using the target compositions for the subsequent loads, the control system 110 determines operating instructions for one or more machines 102-108, for controlling the machines 102-108 to extract and deliver the appropriate subsequent loads to the maintain the target blend levels.

At operation 810, control system 110 provides the determined operating instructions to a second machine 102-108 (e.g., separate from a first machine 102-108 from which the first data was received in operation 802). As discussed above, the control system 110 determines dig locations and assigns excavators 102 to the dig locations, dispatches trucks 104 to particular excavators 102 and dig locations, assigns trucks 104 to particular crushers 106, and the like. Each of these examples are operating instructions determined by the control system 110 so that the appropriate materials will be extracted, hauled, processed, and added to the blend in order to maintain an optimal material blend and/or target blend range, and/or to optimize for one or more additional factors (e.g., machine efficiency, driving distance, material processing rate, etc.). The operating instructions are provided to machines 102-108 via wireless communication systems and/or other communication techniques. In some examples, providing instructions to partially or completely autonomous machines 102-108 includes directly controlling the operations of the machines 102-108 via remote controlling capabilities. In other examples, control system 110 transmits instructions to operators of the machines 102-108, recommending or instructing the operators to perform the target operations with the machines 102-108.

FIG. 9 shows an example process 900 of managing a material blend by controlling the machines 102-108 in an environment 100. At operation 902, the control system 110 receives sensor data from a machine 102-108 transporting a material load. In some examples, operation 902 is similar or identical to operation 802 described above. Additionally or alternatively to receiving machine telemetry data, the control system 110 receives other machine sensor data at operation 902, including data from cameras, environmental sensors, etc.

At operation 904, the control system 110 performs an initial determination of the characteristics of the material load, based on the sensor data. For instance, the control system 110 calculates various characteristics (e.g., percentages of materials, modifiers, impurities, etc.), based on the amounts of materials extracted from different locations at the mine site, and the material grade and attribute data for those locations. At operation 906, the control system 110 determines new or updated characteristics of a material blend associated with the material load. As discussed above, the determination of material load and/or material blend characteristics may depend on the type of machine 102-108 and the type of sensor data received at operation 902. For instance, for an excavator 102 used to scoop material at a mine site into a truck 104, the control system 110 uses the location of excavator 102 the machine telemetry (e.g., number of dippers performed, timing of dippers, etc.) to determine how much material was moved from the excavator 102 to a truck 104. Similarly, for truck 104, the control system HO uses the locations of the truck 104 and various telemetry data (e.g., weight sensors, dump body movements, dumping events) at different times to determine where the truck 104 picked up a material load and the size of the load. Using this data, along with material attribute data for different locations (e.g., mining blocks) in the environment 100, the control system 110 determines material characteristics for a material load extracted, transported, or processed by a crusher 106. Similarly, the characteristics of the material blend are determined based in part on the characteristics of the material load added to the blend, as well as the based on previous characteristics of blend and/or other material loads within the blend. For instance, the control system 110 calculates changes to material blend characteristics based on the size of the blend, the size (e.g., mass, weight, etc.) of the material load added to the blend, and the characteristics (e.g., percentages of materials) within both the current blend and material load to be added.

At operation 908, the control system 110 determines operating instructions for one or more machines 102-108, based on the characteristics of the material blend, and provides the operating instructions to the machines 102-108, In some examples, operation 908 is similar or identical to operations 808 and 810. At discussed above, the control system 110 determines operating instructions, in some cases, in order to manage the material characteristics of the material blend (e.g., maintaining the blend at an optimal level or within a target range). By way of example, if the control system 110 determines at operation 906 that the characteristics of the material blend have exceeded a target range for a certain material substance, impurity, or modifier, then the control system 110 at operation 908 determines operating instructions that will add a subsequent material load to the blend to lower the specific characteristics of the material blend back into the target range.

At operation 910, the control system 110 receives additional data form one or more additional data sources associated to the same material load. In some examples, operation 910 is similar or identical to operation 804 described above. For instance, the control system 110 receives additional multi-phase data (e.g., at different time periods) from one or more additional data source(s). The additional data received at 910 may include one or more of site-wide telemetry and/or sensor data received from additional machines 102-108 in the environment 100, additional detailed material attribute data received from one or more external data sources 116, and/or output from a trained model received from the machine-learning engine 112.

At operation 912, the control system 110 determines whether the characteristics of the material load are affected by the additional data received at operation 910. As described above regarding modifying the material tracking events in the historical and predicted event timelines managed by the material tracking service 502, certain modifications to an event need not affect the characteristics of the material load associated with the event. For instance, a modification to a time stamp or machine identifier within a material tracking event record might not affect the characteristics of the material load. However, modifications to event data such as the material identifier, material attributes (e.g., material grades, modifiers, mass, source block identifiers or locations, etc.), may potentially affect the characteristics of the load. Additionally, as discussed above, certain modifications to a material tracking event record override the previous record while others do not (e.g., based on the rules engine 114 and/or configuration settings). Modifications that do not override the previous record also will not affect the material load characteristics.

If the material load characteristics will not be affected by the additional data received at operation 910, then the process returns to operation 910 to receive additional data regarding the material load at later time (e.g., a subsequent phase in the multi-phase implementation). However, if the material load characteristics is affected (or potentially affected) by the additional data received at operation 910, then the process proceeds to operation 914, where the control system 110 determines the updated characteristics of the material load. After determining the updated characteristics of the material load, the process returns to operation 906 to determine updated characteristics for the material blend, and (at operation 908) update the determinations and controlling of machines 102-108 based on the updated blend characteristics.

Industrial Applicability

The present disclosure relates generally to the controlling material blends that are accumulated at a mine site, and in turn, transported to an off-site processing plant. By ensuring that a material blend is delivered as specified, in accordance with material composition ranges and other blend characteristics for material modifiers, impurities, etc., the mine site provides the processing plant with material stockpiles that are maintained with acceptable grade and material homogeneity, and that dump material conforms to design requirements.

Additionally, the various techniques described herein improve efficiency of the assignments of machines at a mine site. For example, the multi-phased implementation described above, for receiving and analyzing data relating to a machine or material load at different times, reduces or minimizes periods of inactivity by the machines, while also efficiently managing and maintaining material blends within target blend ranges. For instance, multi-phase implementations provide several potential advantages and improvements over other systems, including performing quick initial determinations so that the machines 102-108 do not remain idle within the environment 100, while also providing flexibility to revise previous determinations based on newer data received by the control system 110.

Whereas certain systems assign instructions based on rigid rule-based guidelines to minimize machine idle times, transport times, etc., the control system 110 tracks and analyzes both historical and predicted events, and modifies operational instructions accordingly to efficiently achieve or maintain the material blend within the target blend range in order to further improved efficiency at the mine site. Known systems do not implement the same degree of multi-phase and granular monitoring of material movement throughout the mine site.

While certain examples described herein relate to machines in a mining environment, the techniques described herein (e.g., processes, apparatuses, computer systems, non-transitory computer-readable media readable storing computer executable instructions, etc.) provide utility in other environments where dispatch instructions and optimization of material transport are provided via a plurality of machines traveling between different locations within an environment. For instance, the various techniques described herein are applicable to paving sites, industrial sites, factory floors, building construction sites, road construction sites, quarries, or the like.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A system, comprising:
a first machine configured to transport a material load from a material source to a material processor, wherein the material load is incorporated into a cumulative material blend at the material; and
a control system having:
one or more central processing units (CPUs), and
memory storing executable instructions that, when executed by the one or more CPUs, cause the control system to:
identify a material tracking record indicating an initial load determination of one or more characteristics of the material load transported by the first machine, the material tracking record having been generated, during a first phase and based on initial data received from the first machine, substantially in real-time within a threshold period of time following receipt of the initial data;
determine, during a second phase time after the first phase, and based on additional data associated with the material load received during the second phase from a data source separate from the first machine, that the initial load determination indicated by the material tracking record is erroneous or incomplete;
update, during the second phase, the material tracking record to indicate an updated load determination of the one or more characteristics of the material load, based at least in part on the initial data received during the first phase and the additional data received during the second phase;
generate, during the second phase, operating instructions for at least one of the first machine or a second machine, based at least in part on the updated load determination indicated by the material tracking record; and
provide, during the second phase, the operating instructions to the at least one of the first machine or the second machine, wherein the operating instructions cause the at least one of the first machine or the second machine to perform one or more operations.

2. The system of claim 1, wherein:
the initial data comprises first telemetry data indicative of a first operation performed by the first machine in association with the material load, and
the additional data comprises second telemetry data indicative of a second operation performed by the second machine in association with the material load.

3. The system of claim 1, wherein:
the initial data identifies a dig location where the first machine obtained the material load, and
the additional data comprises material attribute data, associated with the dig location, indicating attributes of the material load.

4. The system of claim 1, wherein:
the initial data is indicative of a plurality of operations performed by the first machine,
the executable instructions further cause the control system to input the initial data into a trained machine-learned model,
the additional data comprises an output of the trained machine-learned model, and
the additional data identifies a subset of the plurality of operations, performed by the first machine, that is associated with the material load.

5. The system of claim 1, wherein:
first operating instructions, causing the at least one of the first machine or the second machine to perform one or more first operations, were generated and provided during the first phase to the at least one of the first machine or the second machine, based on the initial load determination of the one or more characteristics of the material load indicated by the material tracking record, and
the operating instructions, generated during the second phase based at least in part on the updated load determination, are second operating instructions that cause the at least one of the first machine or the second machine to perform the one or more operations, the one or more operations being different from the one or more first operations.

6. The system of claim 1, wherein:
the executable instructions further cause the control system to:
identify a material blend record, indicating an initial blend determination of one or more material characteristics of the cumulative material blend, the material blend record having been generated during the first phase based at least in part on the initial load determination of the one or more characteristics of the material load indicated in the material tracking record; and
update, during the second phase, the material blend record to indicate one or more updated material characteristics of the cumulative material blend, by modifying the initial blend determination based at least in part on the updated load determination of the one or more characteristics of the material load indicated by the material tracking record; and
the operating instructions, provided during the second phase, assign a second material load to the at least one of the first machine or the second machine, based at least in part on the one or more updated material characteristics of the cumulative material blend indicated by the material blend record.

7. The system of claim 1, wherein:
the initial load determination is a first prediction generated by a machine-learning engine based on the initial data; and
the updated load determination is a second prediction generated by the machine-learning engine based at least in part on the initial data and the additional data.

8. A method, comprising:
identifying a material tracking event record, associated with a material load transported by a first machine and incorporated into a cumulative material blend at a material processor, indicating an initial load determination of one or more characteristics of the material load, the material tracking event record having been generated, during a first phase and based on initial data received from the first machine, substantially in real-time within a threshold period of time following receipt of the initial data;
determining, during a second phase after the first phase, and based on additional data associated with the material load received during the second phase from a data source separate from the first machine, that the initial load determination indicated by the material tracking event record is erroneous or incomplete;
updating, during the second phase, the material tracking event record to indicate an updated load determination of the one or more characteristics of the material load, based at least in part on the initial data received during the first phase and the additional data received during the second phase, wherein updating the material tracking event record comprises generating an event modification record that overrides at least a portion of the material tracking event record;
generating, during the second phase, operating instructions for at least one of the first machine or a second machine, based at least in part on the updated load determination indicated by the material tracking event record in combination with the event modification record; and
providing, during the second phase, the operating instructions to the at least one of the first machine or the second machine, wherein the operating instructions cause the at least one of the first machine or the second machine to perform one or more operations.

9. The method of claim 8, further comprising:
identifying a material blend record, indicating an initial blend determination of one or more material characteristics of the cumulative material blend, the material blend record having been generated during the first phase based at least in part on the initial load determination of the one or more characteristics of the material load indicated in the material tracking event record; and
updating, during the second phase, the material blend record to indicate one or more updated material characteristics of the cumulative material blend, by modifying the initial blend determination based at least in part on the updated load determination of the one or more characteristics of the material load indicated by the material tracking event record in combination with the event modification record,
wherein the operating instructions, provided during the second phase, assign a second material load to the at least one of the first machine or the second machine, based at least in part on the one or more updated material characteristics of the cumulative material blend indicated by the material blend record.

10. The method of claim 9, further comprising:
determining, during the second phase, that a first updated material characteristic of the cumulative material blend, indicated by the material blend record, meets or exceeds a characteristic value associated with a target blend range; and
selecting, during the second phase, and in association with the operating instructions, the second material load from a plurality of material loads to be assigned to the second machine, based at least in part on determining that the first updated material characteristic of the cumulative material blend meets or exceeds the characteristic value associated with the target blend range.

11. The method of claim 8, wherein:
the initial data comprises first telemetry data indicative of a first operation performed by the first machine in association with the material load, and
the additional data comprises second telemetry data indicative of a second operation performed by the second machine in association with the material load.

12. The method of claim 8, wherein:
the initial data identifies a dig location where the first machine obtained the material load, and
the additional data comprises material attribute data associated with the dig location.

13. The method of claim 8, wherein:
the initial data is indicative of a plurality of operations performed by the first machine,
the method further comprises inputting the initial data into a trained machine-learned model,
the additional data comprises an output of the trained machine-learned model, and
the additional data identifies a subset of the plurality of operations, performed by the first machine, that is associated with the material load.

14. The method of claim 8, wherein:
first operating instructions, causing the at least one of the first machine or the second machine to perform one or more first operations, were generated and provided during the first phase to the at least one of the first machine or the second machine, based on the initial load determination of the one or more characteristics of the material load indicated by the material tracking event record, and
the operating instructions, generated during the second phase based at least in part on the updated load determination, are second operating instructions that cause the at least one of the first machine or the second machine to perform the one or more operations, the one or more operations being different from the one or more first operations.

15. A system, comprising:
a first hauling machine operable to transport materials from one or more material sources to one or more material processors within an environment, the first hauling machine comprising:
one or more first sensors configured to detect at least one of first machine state data or first environmental data associated with the first hauling machine; and
a first wireless communication system;
a second hauling machine operable to transport the materials from the one or more material sources to the one or more material processors within the environment, the second hauling machine comprising:
one or more second sensors configured to detect at least one of second machine state data or second environmental data associated with the second hauling machine; and
a second wireless communication system; and
a remote processing system having:
one or more central processing units (CPUs), and
memory storing executable instructions that, when executed by the one or more CPUs, cause the remote processing system to:
identify a material tracking event record that:
is associated with a material load transported by the first hauling machine and incorporated into a cumulative material blend at a material processor of the one or more material processors, indicates an initial load determination of one or more characteristics of the material load, and
was generated during a first phase, based on initial sensor data captured by the one or more first sensors, substantially in real-time within a threshold period of time following receipt of the initial sensor data transmitted via the first wireless communication system;
determine, during a second phase after the first phase, and based on additional data associated with the material load received during the second phase from a data source separate from the first hauling machine, that the initial load determination indicated by the material tracking event record is erroneous or incomplete;
update, during the second phase, the material tracking event record to indicate an updated load determination of the one or more characteristics of the material load, determined based at least in part on the initial sensor data and the additional data received during the second phase, wherein updating the material tracking event record comprises generating an event modification record that at overrides at least a portion of the material tracking event record;
generate, during the second phase, one or more operating instructions for the second hauling machine, based at least in part on the updated load determination of the one or more characteristics of the material load indicated by the event modification record in combination with the material tracking event record; and
transmit, during the second phase, the one or more operating instructions to the second wireless communication system of the second hauling machine, wherein the one or more operating instructions cause the second hauling machine to perform one or more operations.

16. The system of claim 15, wherein:
the executable instructions further cause the remote processing system to:
identify a material blend record, indicating an initial blend determination of one or more material characteristics of the cumulative material blend, the material blend record having been generated during the first phase based at least in part on the initial load determination of the one or more characteristics of the material load indicated in the material tracking event record; and
update, during the second phase, the material blend record to indicate one or more updated material characteristics of the cumulative material blend, by modifying the initial blend determination based at least in part on the updated load determination of the one or more characteristics of the material load indicated by the material tracking event record in combination with the event modification record; and
the one or more operating instructions, provided during the second phase, assign a second material load to the second hauling machine, based at least in part on the one or more updated material characteristics of the cumulative material blend indicated by the material blend record.

17. The system of claim 15, wherein:
the initial sensor data comprises data indicative of a first operation performed by the first hauling machine in association with the material load, and the additional data comprises second sensor data indicative of a second operation performed by the second hauling machine in association with the material load.

18. The system of claim 15, wherein:

the initial sensor data identifies a dig location associated with the material load, and the additional data comprises material attribute data associated with the dig location.

19. The system of claim 15, wherein:

the initial sensor data is indicative of a plurality of operations performed by the first hauling machine, the executable instructions further cause the remote processing system to input the initial sensor data into a trained machine-learned model, the additional data comprises an output of the trained machine-learned model, and the additional data identifies a subset of the plurality of operations, performed by the first hauling machine, that is associated with the material load.

20. The system of claim 15, wherein:

first operating instructions, causing the second hauling machine to perform one or more first operations, were generated and provided during the first phase to the second hauling machine, based on the initial load determination of the one or more characteristics of the material load indicated by the material tracking event record, and the operating instructions, generated during the second phase based at least in part on the updated load determination, are second operating instructions that cause the second hauling machine to perform the one or more operations, the one or more operations being different from the one or more first operations.

* * * * *